United States Patent [19]
Johansson et al.

[11] Patent Number: 5,054,341
[45] Date of Patent: Oct. 8, 1991

[54] APPARATUS AND METHOD FOR TRIMMING A CAN BODY

[75] Inventors: Bert E. Johansson; Ray L. Bowles, both of Golden, Colo.

[73] Assignee: Coors Brewing Company, Golden, Colo.

[21] Appl. No.: 435,196

[22] Filed: Nov. 13, 1989

[51] Int. Cl.$^5$ .............................................. B23B 1/00
[52] U.S. Cl. .......................................... 82/47; 82/48; 82/53; 82/56; 82/58
[58] Field of Search .................... 82/47, 48, 52, 53, 56, 82/57, 58, 88

[56] References Cited

U.S. PATENT DOCUMENTS

| | | |
|---|---|---|
| 1,421,263 | 6/1922 | Lea . |
| 3,425,251 | 2/1969 | Maytag . |
| 4,014,228 | 3/1977 | Dean ........................................ 82/47 |
| 4,181,050 | 1/1980 | Stroobants et al. ...................... 82/56 |

Primary Examiner—James G. Smith
Assistant Examiner—Jack Lavinder
Attorney, Agent, or Firm—Klaas & Law

[57] ABSTRACT

Apparatus and method for trimming away a portion of the open end of an untrimmed can body to form a trimmed can body and a trimmed away portion using a plurality of can trimming apparatuses which are mounted on a turret which is secured to a main drive shaft for rotation therewith. Each of the can trimming apparatus has mechanisms for cutting the untrimmed can body to form a trimmed can body and a trimmed away portion; for separating the trimmed can body from the trimmed away portion by moving both in one axial direction and then only the trimmed can body in the opposite axial direction; for loading untrimmed can bodies onto each can processing apparatus and for unloading trimmed can bodies therefrom and for cutting, knurling and disposing of the trimmed away portions. A collapsibe mandrel is provided and comprises a hollow support member having a plurality of axially and radially outwardly extending resilient fingers integral therewith and a bearing surface mounted on an adjustable elongated hollow member in contact with the resilient fingers to control the radially outward extent thereof. Also, an annular spacer is located between a first knife and a first knurling roller to provide a space for the portion to be trimmed away prior to the knurling operation. A positive can body loading and unloading system is also provided.

41 Claims, 13 Drawing Sheets

APPARATUS AND METHOD FOR TRIMMING A CAN BODY

This application is a continuation-in-part of U.S. Patent Application Ser. No. 286,086 filed Dec. 19, 1988, now abandoned and of U.S. Patent Application Ser. No. 337,359 filed Apr. 13, 1989, now U.S. Pat. No. 4,969,635.

FIELD OF THE INVENTION

This invention relates generally to the manufacture of can bodies for use as containers, such as beverage containers, and more particularly to the portion of the manufacturing operation wherein the uneven end of the can body is trimmed to form a can body of the proper axial extent.

BACKGROUND OF THE INVENTION

In the manufacture of cans for use as containers, such as beverage containers and particularly when the cans are formed from aluminum, the manufacturing processes generally employed produce a can body which at one stage has a longitudinal length greater than that desired for future operations to form a finished can body ready to receive an end cap and an uneven edge. Therefore, it is necessary that a portion of the sidewall of the can body be removed so as to produce a can body having a proper axial length. The most conventional methods for trimming a portion of the can body utilize knives or cutting edge in various ways in which there is relative rotation between the can body and the cutting edge. One such method is disclosed in U.S. Pat. No. 3,425,251 to Maytag wherein a can body is positioned over a rotatable upper knife and a large rotatable tool carrier wheel which has a knife mounted on a portion of its periphery so that during rotation of the tool carrier wheel the knife cooperates with the upper knife to trim away a portion of the can body. Maytag also discloses apparatus to cut and knurl the trimmed away portion of the can body. Another method for trimming a can body is disclosed in U.S. Pat. No. Re. 30,746 to Stroobants et al. wherein a turret is mounted on a rotatable main support shaft for rotation therewith and a plurality of cutter cartridge units are removably secured to the turret. During rotation of the turret, an untrimmed can body is positioned over a rotatable first knife which has a diameter substantially less than the inner diameter of the can body. A rotatable second knife is located so that it can be moved to a position to cooperate with the first knife to trim away a portion of the can body. The second knife has a diameter substantially less than the outer diameter of the can body. Stroobants et al. do not disclose an apparatus for cutting and knurling the trimmed away portion of the can body.

In the normal operation of a can body manufacturing operation using apparatus such as the type illustrated in U.S. Pat. No. 3,425,251 to Maytag, it is necessary to change the forming sleeve on the front end of the ram at periodic intervals because of wear and tear on the forming sleeve. At each change, the forming sleeve is reground and polished so that the diameter of the forming sleeve is reduced at each change. This of course results in the formation of can bodies having cylindrical sidewalls with smaller inner diameters after each change of the forming sleeve. In one type of operation, it is customary to change the forming sleeve between fifty and sixty times, so that can bodies of fifty to sixty differing diameters are produced. This also has an effect on the apparatus wherein a portion of the can body having an uneven edge at the open end thereof is trimmed away. In such apparatus, it is conventional to use a collapsible mandrel wherein a plurality of resilient fingers are integral with a support having a longitudinal axis wherein the resilient fingers extend in axial and radially outward directions from the support. A locking ring is used in conjunction with the support and the resilient fingers to limit the radially outward movement of the resilient fingers while permitting limited radially inward movement of the resilient fingers. The resilient fingers are designed to contact the inner peripheral surface of the can body so as to hold the can body for rotation therewith. The nature of the resilient fingers is such that when the diameter of the inner peripheral surface has been changed by several changes of the forming sleeve, it is necessary to change the locking ring because either too much force has to be placed on the can bodies to move the can bodies over the resilient fingers having an outer diameter for can bodies having larger inner diameters or the resilient fingers will not hold the can body firm enough to prevent relative rotation between the can body and the resilient fingers. Thus, as described below, even though the difference in inner diameters of the can bodies and outer diameters of the resilient fingers as controlled by the locking rings is very small, it is necessary to change the locking rings for can bodies of smaller or larger inner diameters for the satisfactory operation of the can body trimming apparatus. In trimming apparatus used with the can body manufacturing apparatus described above, it is customary to have six different locking rings to accommodate the fifty to sixty differing sizes of can bodies. The forming sleeves for the above operation have a maximum diameter of 2.4783 inches and a minimum diameter of 2,4723 inches and the six locking rings have internal cylindrical surfaces for limiting the radially outward movement of the resilient fingers having diameters of 2.007; 2.009; 2.011; 2.013; 2.015 and 2.017 inches. Therefore, after a plurality of changes of the forming sleeves, it is necessary to change the locking ring of the trimming apparatus. In some trimming apparatuses, a plurality of trimming stations are mounted on a rotating turret so that, when can bodies having a different internal diameter are to be processed, it is necessary to change a plurality of locking rings.

BRIEF DESCRIPTION OF THE INVENTION

This invention provides an apparatus and method for trimming away a portion of a can body having an uneven edge to produce a can body of a desired axial extent wherein a plurality of can trimming apparatuses are removably secured on mounting surfaces of a rotatable turret and wherein each of the can processing apparatuses has means for trimming away a portion of the can body having an uneven edge and cutting and knurling the trimmed away portion.

This invention also provides a collapsible mandrel for a trimming apparatus wherein the radially outer diameter of a plurality of resilient fingers of the collapsible mandrel may be varied without removing any portion thereof from the trimming apparatus.

In the preferred embodiment of the invention, a main drive shaft is rotatably mounted on support structure and rotated by drive means. A turret having a plurality of mounting surfaces is secured to the main drive shaft for rotation therewith. A can trimming apparatus having means for trimming away a portion of the can body having an uneven edge and cutting and knurling the trimmed away portion is removably secured on each of the mounting surfaces. Each can trimming apparatus comprises a housing having a radially outer first shaft rotatably mounted therein with the first shaft having exposed first and second end portions and a radially inner second shaft rotatably mounted therein with the second shaft having exposed first and second end portions. A can body supporting means is mounted on the first end portion of the first shaft for rotation therewith and a radially outer knife is also mounted on the first end portion of the first shaft for rotation therewith and is located axially inwardly from the can body supporting means and is positioned to contact the inner surface of the can body. The can body having the uneven edge is supported by the can body supporting means so that a portion having the uneven edge is located on the first shaft axially inwardly from the radially outer knife. A first knurling roller is mounted on the first end portion of the first shaft for rotation therewith and has an axial extent in a radially inward direction from the radially outer knife that is greater than the extent of the portion having the uneven edge and has a peripheral portion located within the portion having the uneven edge. A member having a peripheral surface is mounted on the first end portion of the second shaft for rotation therewith and the peripheral surface has at least a first arcuate portion having a knife edge formed thereon and located to contact the outer surface of the can body and having a radius great enough so that it can cooperate with the radially outer knife to trim the portion having the uneven edge from the can body. The peripheral surface also has at least a second portion having a radius sufficiently less than the radius of the knife edge so that a can body may be positioned on the can body supporting means. Loading and unloading means are provided for loading an untrimmed can body having an uneven edge on the open end thereof onto the can body supporting means, for retaining the untrimmed can body on the can body supporting means and for removing a trimmed can body from the can body supporting means. After an untrimmed can body has been loaded onto the can body supporting means and the radially outer knife and the knife edge have cooperated to make the desired cut through the side wall of the untrimmed can body, moving means are provided for moving the trimmed away portion and the trimmed can body in an axial direction over the first knurling roller and then moving only the trimmed can body in the opposite axial direction so that no portion of the trimmed can body is over the first knurling roller and unloading the trimmed can body. After the trimmed can body has been unloaded from the can body supporting means, a second knurling roller which is pivotally mounted on the first end portion of the second shaft is moved into a position to cooperate with the first knurling roller to cut and knurl the trimmed away portion. Adjusting means are provided for adjusting the location of the can loading and unloading means so that untrimmed can bodies can be positioned relative to the cutting knives to produce trimmed can bodies of a desired axial extent.

In another preferred embodiment of the invention, there is provided a collapsible mandrel comprising a hollow support member which is adapted to be mounted at a relatively fixed location in the trimming apparatus. The hollow support member has a longitudinal axis and a plurality of integral elongated spaced apart resilient fingers extending in axial and radially outward directions therefrom. The resilient fingers have outer arcuate surfaces comprising a first part shaped generally as a frustum of a cone and a second part shaped generally as a cylinder with the first part being located closer to the hollow support member. An elongated member, having a longitudinal axis coinciding with the longitudinal axis of the hollow support member, is mounted on the hollow support member so as to provide for relative linear movement therebetween in axial directions. The elongated hollow member has a generally cylindrical bearing surface which is in contact with the outer surfaces of the first part of the resilient fingers so as to limit the radially outward movement of the resilient fingers. The relative linear movement between the hollow support member and the elongated hollow member in axial directions functions to vary the radially outer diameter of the resilient fingers so as to accommodate can bodies having cylindrical sidewalls of different inner diameters. The relative linear movement is accomplished by providing an externally threaded portion on the hollow support member and an internally threaded portion on the elongated hollow member in threaded engagement therewith so that rotation of the elongated hollow member results in linear axial movement of the elongated hollow member relative to the hollow support member. The hollow support member and the elongated hollow member are provided with guide means for guiding the internally and externally threaded sections into proper engagement. As a can body is moved over the resilient fingers, it deflects the resilient fingers and moves into a position to establish surface to surface contact between opposite portions of the inner surface of the can body and the second part of the resilient fingers to hold the can body for rotation with the resilient fingers. Locking means are provided for preventing relative rotational movement between the elongated hollow member and the hollow support member. Also, movement limiting means are provided for limiting the radially inward movement of the resilient fingers to protect them from damage from accidental radially inwardly directed forces applied thereto.

In another preferred embodiment of the knurling apparatus, a second knurling roller is mounted on the second shaft for rotation therewith and the first knurling roller is spaced axially inwardly from the cutting knife edge by an annular spacer having an axial extent so that the distance between the cutting edge of the radially outer knife and the axial inner extremity of the annular spacer closest to the first knurling roller is greater than the axial extent of the greatest possible trimmed away portion so that the second knurling roller can contact the portion of the can body to be trimmed away only after it has been positioned over the first knurling roller. The second knurling roller has a peripheral extent only slightly greater than 180 degrees so that the trimmed away portion of the can body can be moved over the knurling roller on the first shaft. Also, another embodiment of loading and unloading apparatus is provided to move the untrimmed and trimmed can bodies in a more positive manner.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
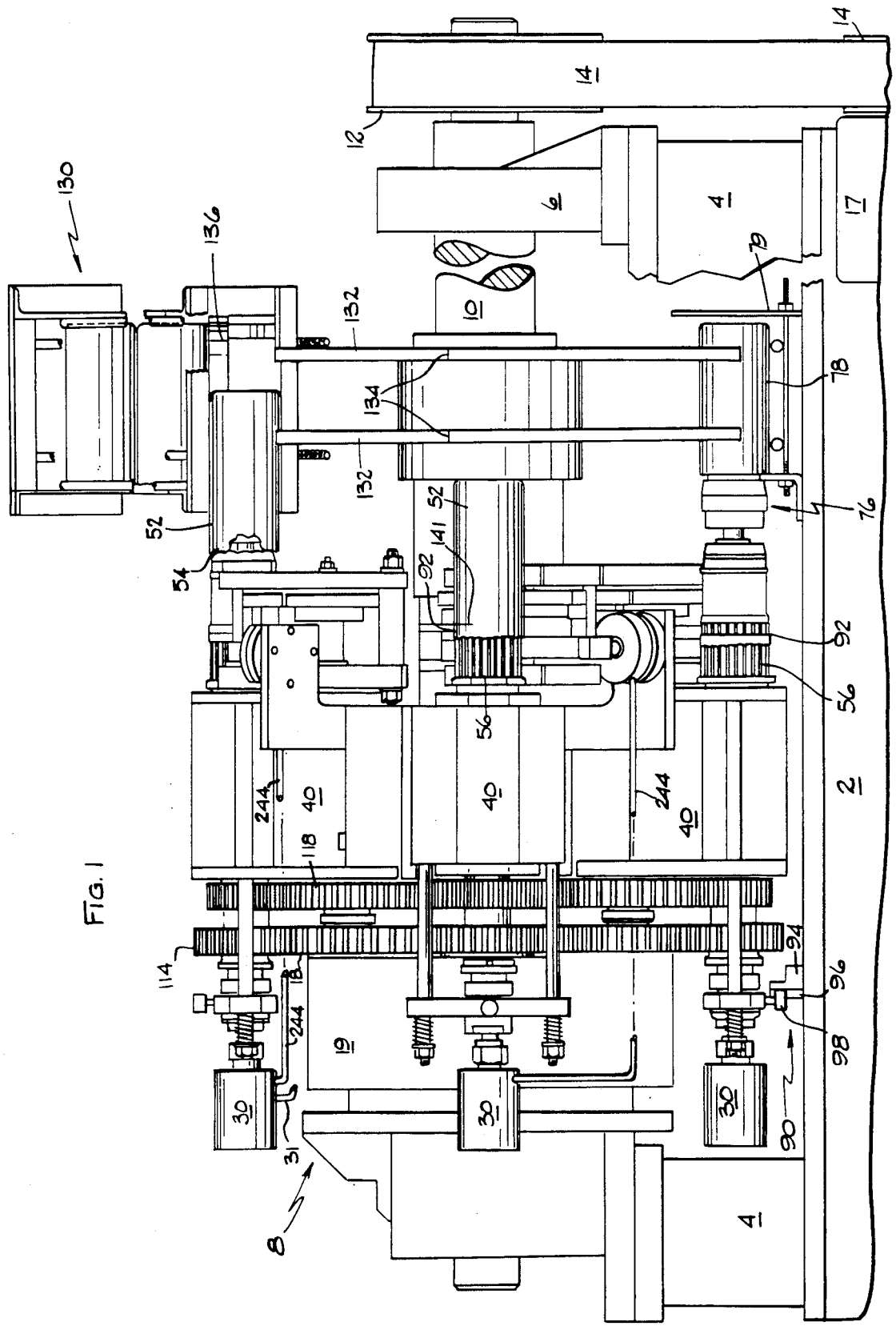
FIG. 1 is a front elevational view of the apparatus of the preferred embodiment of the invention.

The preferred embodiment of the invention is illustrated in the drawings and comprises support structure comprising a base support 2 which is mounted on the floor of a building (not shown). A pair of spaced apart support blocks 4 are mounted on the base support 2 with the right support block 4 having a bearing 6 supported thereon and the left support block 4 having a component support structure 8 having a bearing 6 supported therein. A main drive shaft 10 is rotatably mounted in the bearings 6. A driven pulley 12 is secured to the main drive shaft 8 and is rotated by a driving belt 14 which is powered by a driving pulley 16 which is driven by a conventional motor 17 so as to rotate the main drive shaft 8. The component support structure 8 is securely mounted on the support block 4, left side of FIGS. 1 and 3 and has a relatively large diameter fixed gear 18 mounted on one end thereof by means of a spacer 19. Conventional manifold means 20 are provided, FIG. 3, and comprise a portion 22 that is secured to the main shaft 8 for rotation therewith by conventional means 23 and a fixed portion 24 mounted in the spacer 19 and which is divided into a plurality of compartments 26 for either creating a vacuum or supplying air under pressure. A port 28 is formed in the portion 22 and is connected to a rotary union 30 by suitable tubing 31 for providing a vacuum or air under pressure for use by the can trimming apparatus 32. The number of ports 28 is equal to the number of can trimming apparatuses 32. A turret 34 is mounted on the main drive shaft 8 for rotation therewith and is provided with a plurality of mounting surfaces 36. There are four mounting surfaces provided on the turret illustrated in the drawings, but it is understood that the number of mounting surfaces may be varied as desired.

Figure 3:
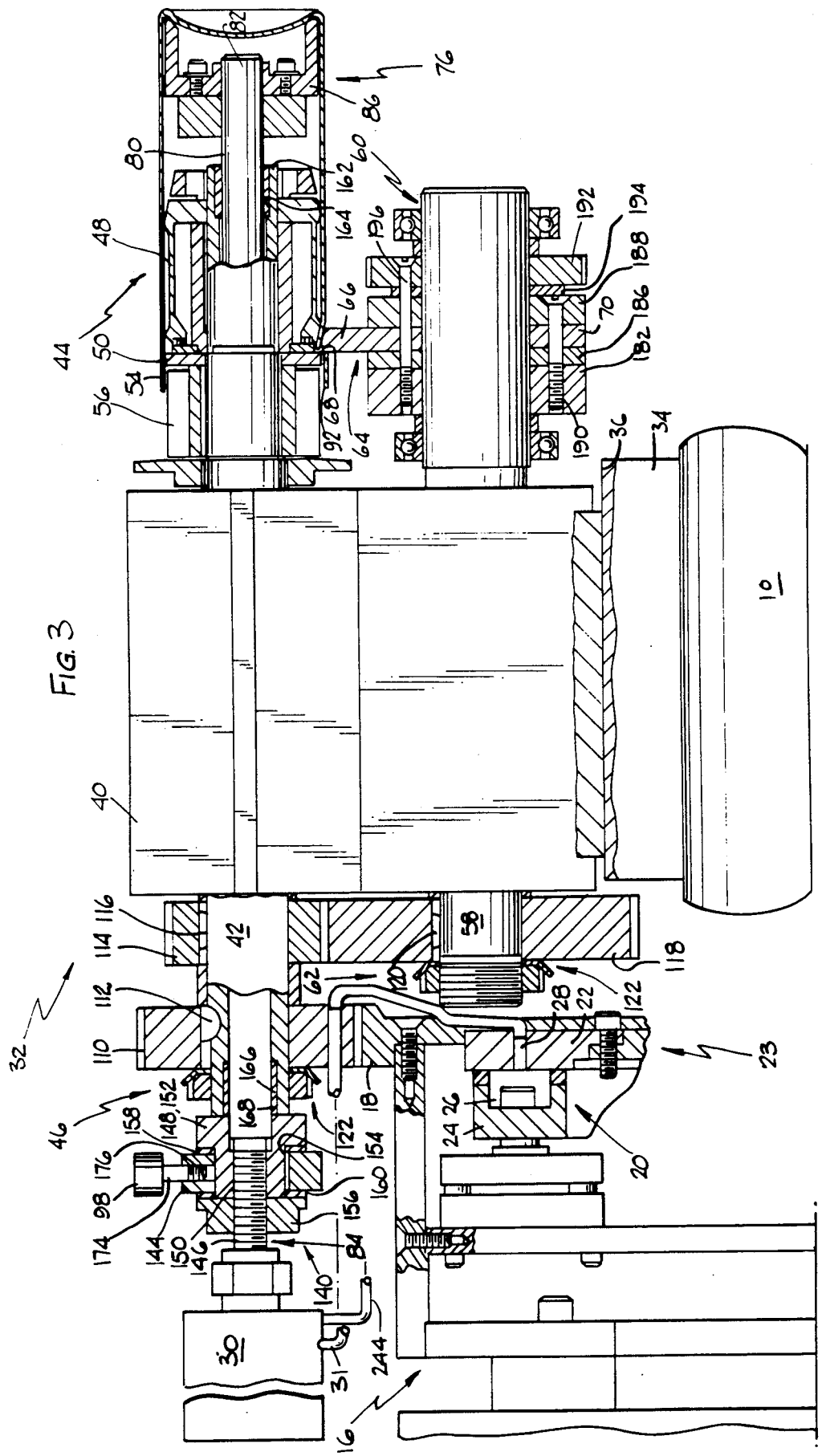
FIG. 3 is a front elevational view with parts in section and parts removed of a can trimming apparatus.

Each can trimming apparatus 32, FIG. 3, comprises a housing 40 which is securely mounted on a mounting surface 36 for rotation with the main drive shaft 10. A first shaft 42 is rotatably mounted in the housing 40 and has a first end portion 44 and a second end portion 46. A conventional can body supporting means 48 comprising a plurality of resilient fingers capable of moving between two fixed stops is mounted on the first end portion 44 for rotation therewith and a radially outer knife 50 is also mounted at a fixed location on the first end portion 44 for rotation therewith and is located axially inwardly from the can body supporting means 48. An untrimmed can body 52, FIG. 1, having an uneven edge 54 is supported on the can body supporting means 48 so that the portion having the uneven edge 54 is located axially inwardly from the radially outer knife 50 which knife 50 is positioned to contact the inner surface of the untrimmed can body 52 during the cutting operation. A first knurling roller 56 is mounted on the first end portion 44 for rotation therewith at a location axially inwardly from the radially outer knife and has an axial extent that is greater than the portion having the uneven edge 54 to be trimmed away and has a portion of its periphery located within the portion having the uneven edge 54. The first knurling roller 56 has an outer diameter which is slightly less than the outer diameter of the radially outer knife 50 so that the trimmed away portion may be pushed over the knurling roller as described below. A second shaft 58 is rotatably mounted in the housing 40 at a location that is radially inward from the first shaft 42 and has a first end portion 60 and a second end portion 62. A member 64 is mounted at a fixed location on the second shaft 58 for rotation therewith and the peripheral surface thereof has at least a first portion 66 having a knife edge 68 having a radius great enough so that it can contact the outer surface of the untrimmed can body 52 and cooperate with the radially outer knife 50 to trim the portion having the uneven edge 54 from the can untrimmed body 52. The peripheral surface of the member 64 has at least a second portion 70 having an arcuate peripheral surface having a radius sufficiently less than the radius of the knife edge 68 so that an untrimmed can body 52 may be positioned on the can body supporting means 48.

Can body loading and unloading means 76 are provided for loading an untrimmed can body 52 onto the can body supporting means 48 and for unloading a trimmed can body 78 from the can body supporting means 48 and comprise a hollow elongated shaft 80 slidably mounted in the first shaft 42 for movement in axial directions and having a first end portion 82 and a second end portion 84. A vacuum cup 86 is secured to the first end portion 82 so that when a vacuum is applied to the hollow elongated shaft 80, as described below, an untrimmed can body 52 will be pulled onto the can body supporting means 48. After the can body 52 has been trimmed, a puff of air is sent through the hollow elongated shaft 80 to blow the trimmed can body 78 off of the can body supporting means 48.

After a can body 52 has been cut, moving means 90, FIG. 1, are provided for moving the trimmed away portion 92 and the trimmed can body 78 in an axial direction over the first knurling roller 56 and then moving only the trimmed can body in the opposite axial direction so that no portion of the trimmed can body 78 is over the first knurling roller 56. The moving means 90 comprise a cam block 94 fixedly mounted on the base support 2 and having a camming surface 96. A cam follower 98 is secured to the hollow elongated shaft 80 and is resiliently urged against a stop member, as described below, so that, as the turret 34 rotates, the cam follower 98 contact the camming surface 96 to move the hollow elongated shaft 80 in the above-described axial directions. After the trimmed can body 78 has been unloaded onto the can discharge chute 79, a second knurling roller 100 (FIG. 5), described more fully below, is moved to a position to cooperate with the first knurling roller 56 to cut and knurl the trimmed away portion 92.

Figure 4:
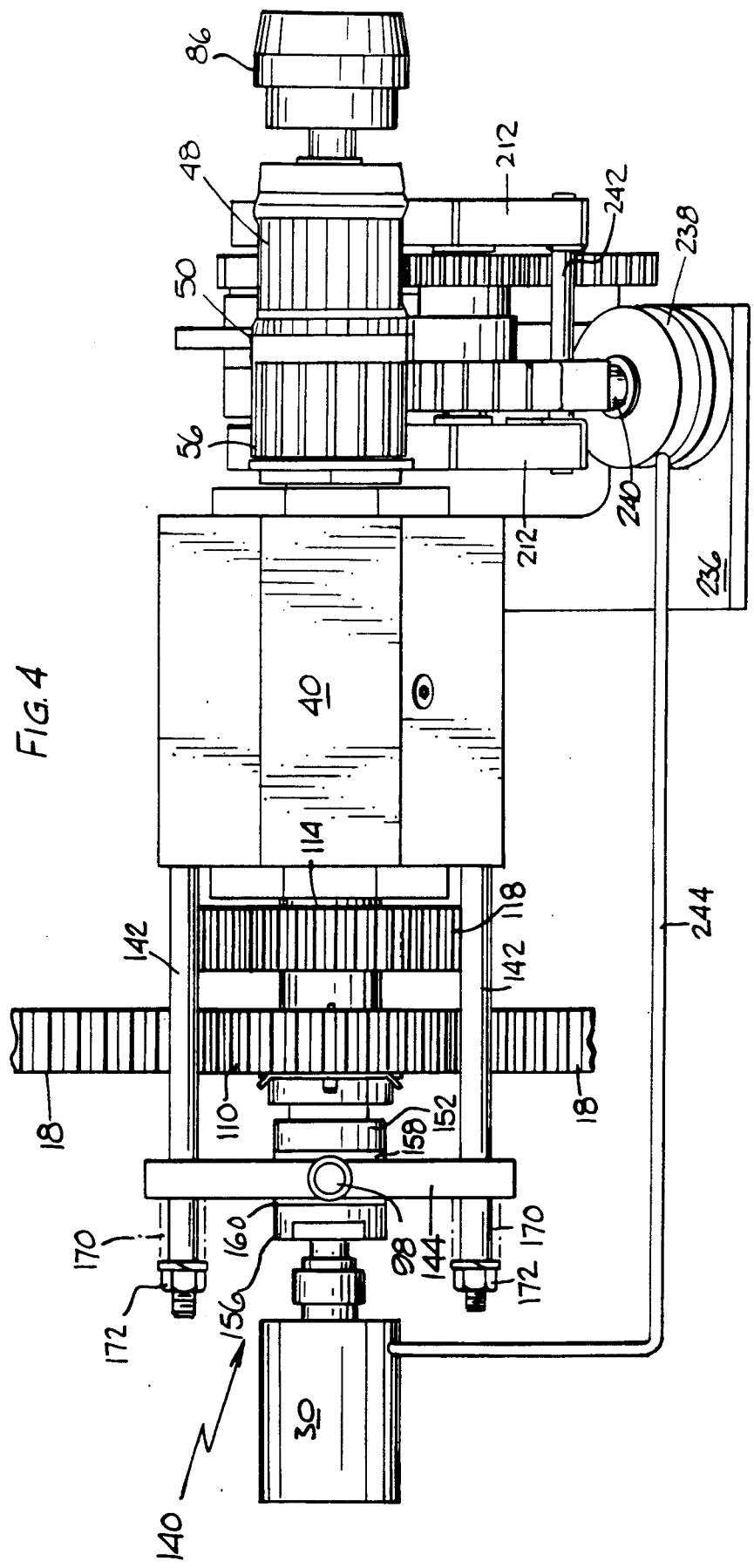
FIG. 4 is a top plan view of FIG. 3 with parts in FIG. 5 added.

The drive means for rotating the first and second shafts 42 and 58 of each can processing apparatus 32 are illustrated in FIGS. 1, 3 and 4 and comprise the stationary gear 18, a first gear 110 mounted on the first shaft 42 for rotation therewith by key means 112 and in mesh with the stationary gear 18 so that as the turret 34 rotates, the first gear 110 is rotated. A second gear 114 is mounted on the first shaft 42 at a location between the housing 40 and the first gear 110 for rotation with the first shaft 42 by key means 116. A third gear 118 is mounted on the second end portion 62 of the second shaft 58 for rotation therewith by key means 120 and is in mesh with the second gear 114 so that rotation of the second gear 114 rotates the third gear 118. Securing means 122 are used to position the first gear 114 on the first shaft 42 and the third gear 118 on the second shaft 58.

Figure 2:
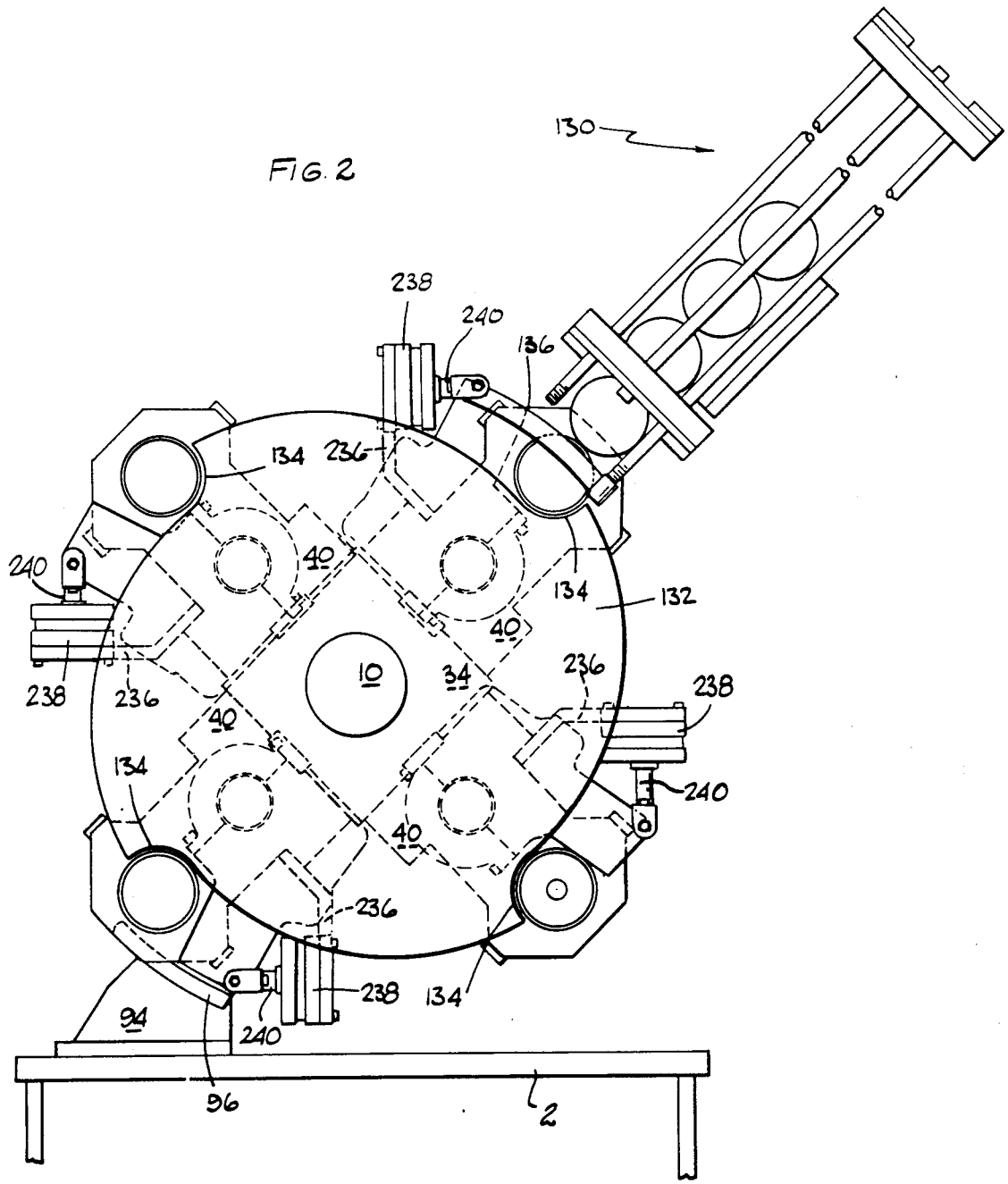
FIG. 2 is a right side elevational view of FIG. 1 with parts removed.

The apparatus for feeding untrimmed can bodies 52 to the can processing apparatuses 32 is illustrated in FIGS. 1 and 2. A can body storage rack 130 is mounted in a fixed position and is provided with a continuous supply of untrimmed can bodies 52 to be removed therefrom. A pair of spaced apart star wheels 132 are mounted on the main drive shaft 8 for rotation therewith and have aligned pockets 134 for contacting the bottom untrimmed can body 52 in the storage rack 130 as they pass by the storage rack 130. A guide bar 136 is mounted on the storage rack 130 and is located to contact the bottom of an untrimmed can body 52 and slide it over the aligned pockets 134 so that the open end of the untrimmed can body 52 moves toward the vacuum cup 86 so that the vacuum cup 86 can pull the untrimmed can body 52 onto the can body supporting means 48.

Adjusting means 140, illustrated in FIGS. 3 and 4, are provided for moving the vacuum cup 86 in axial directions so that the cut 141, FIG. 1, on the untrimmed can body 52 may be made at the desired location to produce a trimmed can body 78 of a desired axial extent. A pair of fixed spaced apart posts 142 extend outwardly from each housing 40 and have longitudinal axes which are parallel to the longitudinal axes of the first shaft 4 and the hollow elongated shaft 80. A cross member 144 is mounted for sliding movement over the posts 142. The outer surface 146 of the second end portion 84 of the elongated hollow shaft 80 is externally threaded. An adjusting nut 148 has an internally threaded portion 150 and an enlarged flanged portion 152 with the internally threaded portion 150 being in threaded engagement with the externally threaded outer surface 146 and being rotatably located in a central bore 154 in the cross member 144. An internally threaded lock nut 156 is in threaded engagement with the externally threaded outer surface 146. A thrust washer 158 is located between the flange portion 152 and the cross member 144 and a thrust washer 160 is located between the cross member 144 and the lock nut 156 so as to secure the hollow elongated shaft 80 on the cross member 144. A bushing 162 seated in a recess 164 in the first end portion 44 of the first shaft 42 and a bushing 166 mounted in a recess 168 in the second end portion 46 of the first shaft 42 provide for sliding movement of the hollow elongated shaft 80 relative to the first shaft 42. A pair of springs 170 are mounted on the posts 142 and extend between the cross member 144 and flanged nuts 172 to urge the flange portion 152 against the end of the first shaft 42. Therefore, rotation of the adjusting nut 148 will move the hollow elongated shaft 80 and therefore the vacuum cup 86 in axial directions relative to the can body supporting means 48.

As illustrated in FIGS. 3 and 4, the cam follower 98 is rotatably mounted on a support stem 174 which is in threaded engagement with a threaded bore 176 in the cross member 144. Therefore, as the cam follower 98 moves over the camming surface 96, it moves the cross member 144 to overcome the springs 170 and move the hollow elongated shaft 80 to the left as viewed in FIG. 3 to move the trimmed away portion 92 and the open end portion of the trimmed can body 78 to a location over the first knurling roller 56 and then to move the trimmed can body 78 only back onto its original position on the can body supporting means 48. The mounting of the cross member 144 on the posts 142 permits the sliding movement of the cross member 144 but prevents any rotational movement of the cross member 144 so that the cam follower 98 remains in position to contact the camming surface 96 during each revolution thereof.

Figure 5:
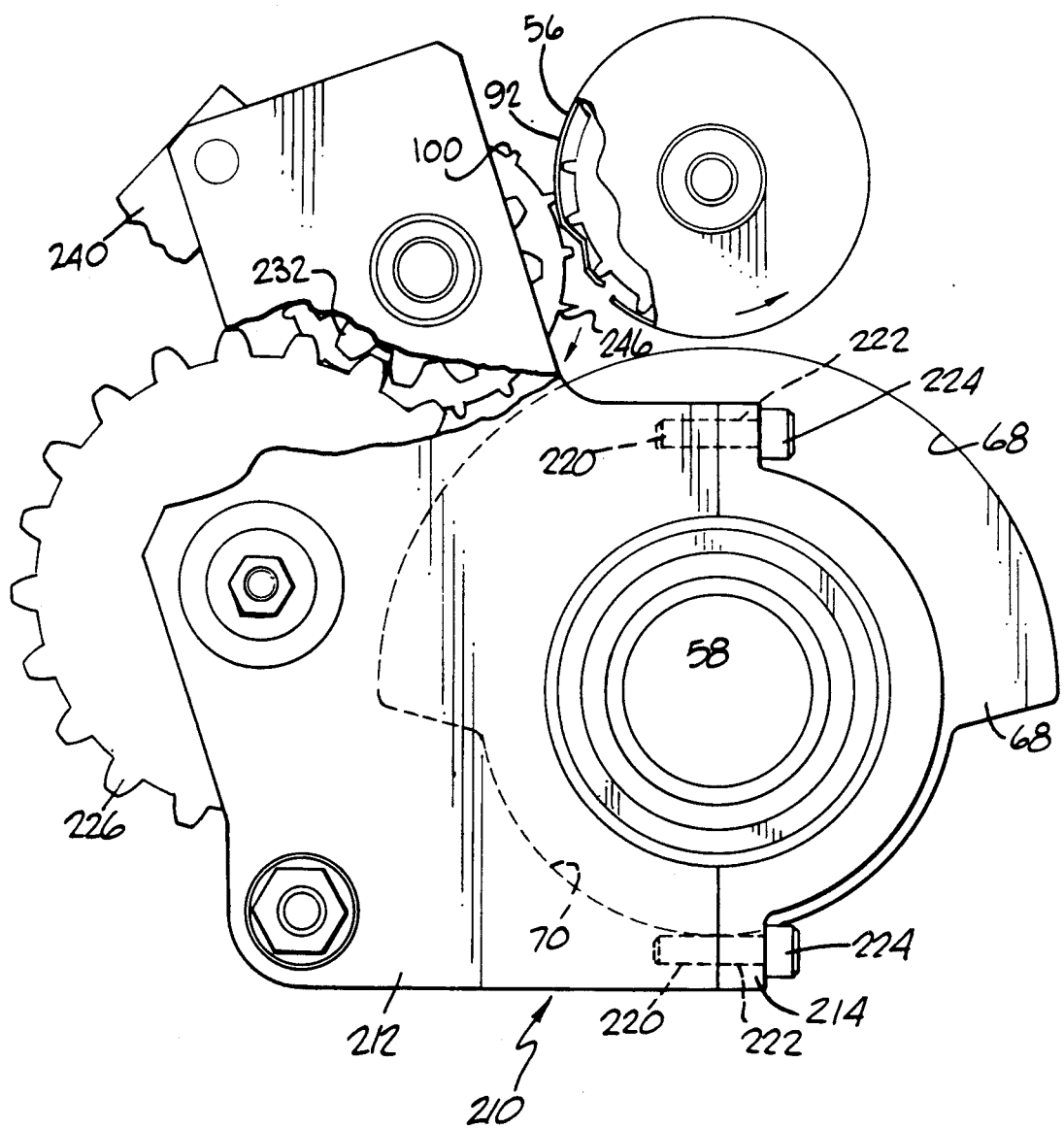
FIG. 5 is an elevational view of the apparatus for mounting the second knurling roller.
Figure 6:
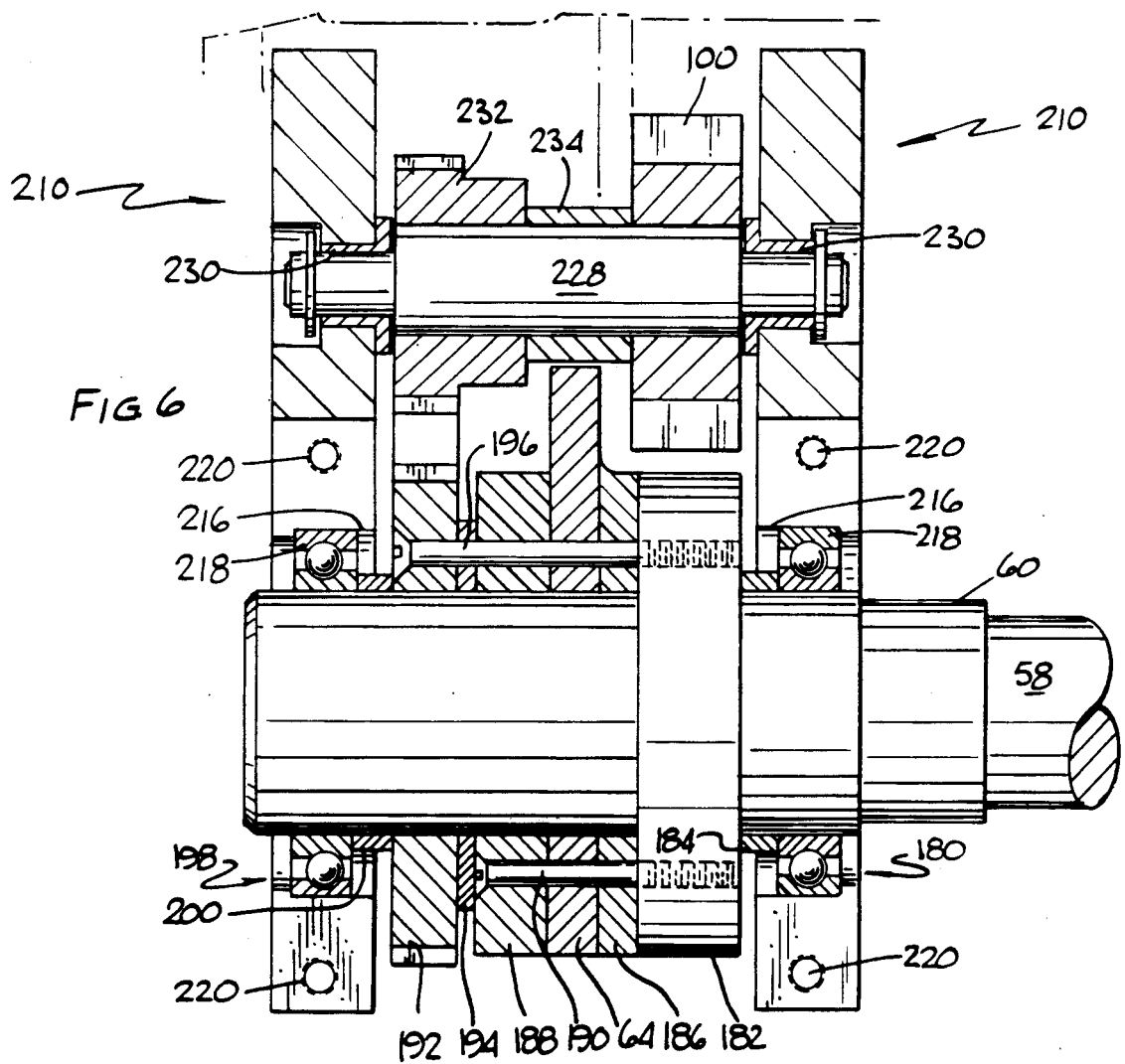
FIG. 6 is a side elevational view from the right side of FIG. 5 with parts in section.

The mounting of the member 64 and the second knurling roller 100 is illustrated particularly in FIGS. 5 and 6. A first bearing 180 is mounted on the first end portion 60 of the second shaft 58. A radially outwardly projecting flange 182 is an integral part of the first end portion 60 and is separated from the first bearing 180 by a washer 184. An annular shim member 186 is positioned over the first end portion 60 and is located between the flange 182 and the member 64 so as to position the knife edge 68 at the proper position for it to cooperate with the radially outer knife 50 in cutting the untrimmed can body 52. An annular clamping member 188 is mounted on the first end portion 60 for contacting the member 64. A plurality of bolts 190 are threadedly mounted in the flange 182 and have enlarged head portions seated in recesses in the annular clamping member 188 so that when the bolts 190 are tightened, the annular clamping member 188, the member 64, the annular shim member 186 are securely fastened on the flange 182. An annular gear 192 is mounted on the first end portion 60 for rotation therewith. An annular washer 194 is mounted between the annular gear 190 and the annular clamping member 188. A plurality of bolts 196 are threadedly mounted in the flange 182 and have enlarged head portions seated in recesses in the annular gear 192 so that, when the bolts 196 are tightened, the annular gear 192 is held in position on the flange 182. A second bearing 198 is mounted on the first end portion 60 and is separated from the annular gear 192 by an annular washer 200.

The mounting means for the second knurling roller 100 comprises a pair of spaced apart split plate members 210 each having a first member 212 and a second member 214. Each of the first and second members 212 and 214 has an inner semi-circular recess 216 which is dimensioned to receive one-half of the outer race 218 of the first and second bearings 180 and 198. The first member 212 has a plurality of threaded openings 220 and the second member 214 has a plurality of bores 222 aligned with the threaded openings 220 so that headed bolts 224 may be used to mount the first and second members 212 and 214 on the first and second bearings 180 and 198. An idler gear 226 is rotatably mounted between the first members 212 and is in mesh with the annular gear 192 to be driven thereby. A shaft 228 is rotatably mounted in bushings 230 secured in the spaced apart first members 212. An annular gear 232 is mounted on the shaft 228 for rotation therewith. The second knurling roller 100 is also mounted on the shaft 228 for rotation therewith and is held in spaced relation to the annular gear 232 by an annular spacer 234. The annular gear 232 is in mesh with the idler gear 226 so as to be driven thereby. A support plate 236, FIGS. 2 and 4, is fixedly mounted on each housing 40 and has an air cylinder 238 fixedly mounted thereon. The piston rod 240 of each air cylinder 238 is rotatably mounted on a rod 242 (FIG. 4) mounted on and extending between the spaced apart first members 212. Movement of the piston rod 240 rotates the split plate member 210 on the first and second bearings 180 and 198 so as to move the second knurling roller 100 into and out of knurling engagement with the first knurling roller 56. Each air cylinder 238 is connected by a tube 244 to the rotary union 30 so that, when a vacuum is being applied to the hollow elongated shaft 80, a vacuum will be applied to the air cylinder 238 to hold the second knurling roller 100 out of knurling relationship with the first knurling rollers 56 and, when air is blown through the hollow elongated shaft 80 to blow a trimmed can body 78 off of the can body supporting means 48 air is also supplied through tube 244 to the air cylinder 236 to move the second knurling roller 100 into knurling relationship with the first knurling roller 56 to cut and knurl the trimmed away portion 92.

Figure 7:
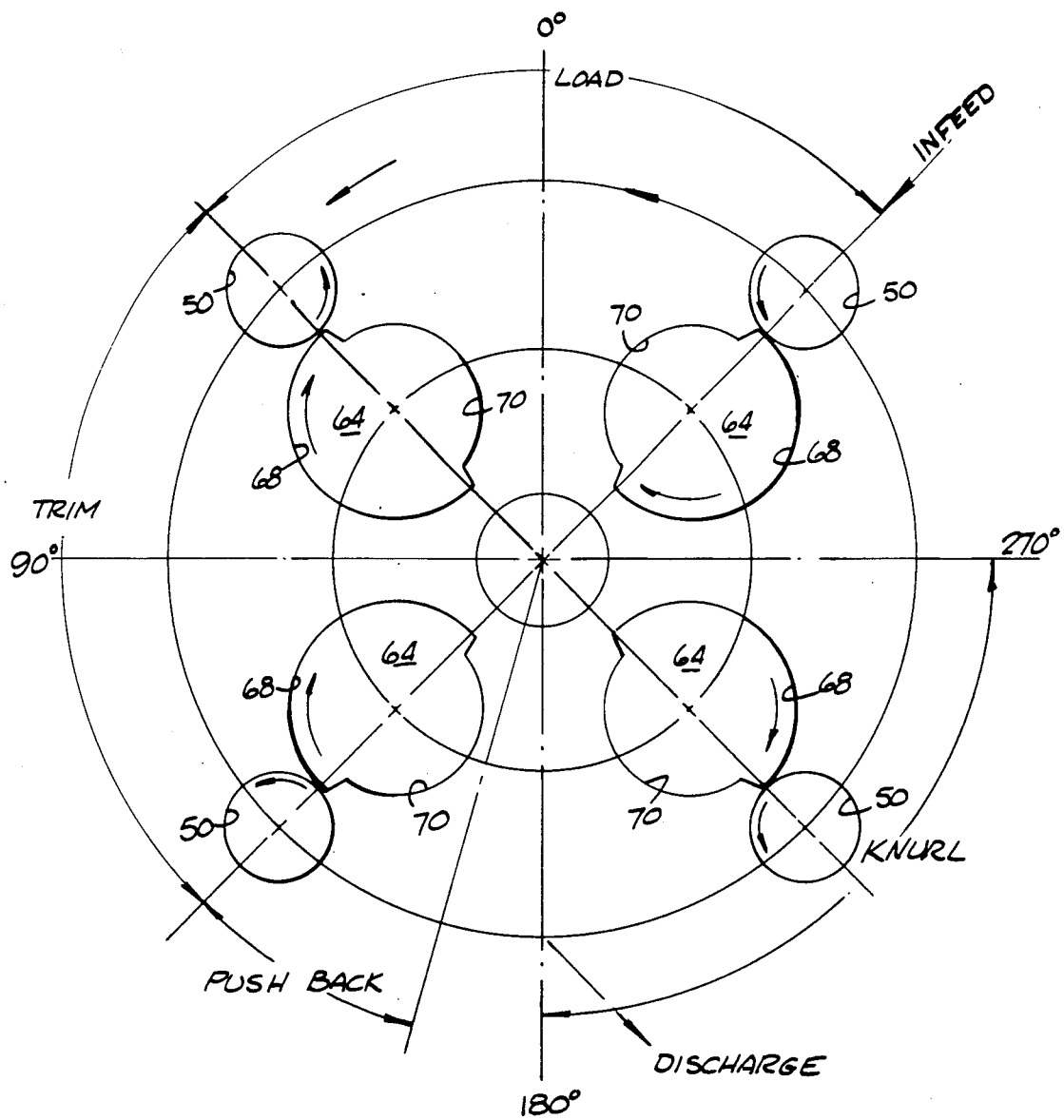
FIG. 7 is a schematic illustration of the relative positions of the cutting knives during each revolution of the turret.

The operation of the apparatus of the preferred embodiment of the invention is schematically illustrated in FIG. 7. As the main drive shaft 8 rotates, the empty pockets 134 of the spaced apart star wheels 132 approach the storage rack 130 located at the 315 degree position on FIG. 7. At this location, the port 28 is opposite a compartment 26 that is applying a vacuum through the tubing 31, the rotary union 30 and the hollow elongated shaft 80 to the vacuum cup 86. As the empty pockets 134 pass the can body storage rack 130, they remove the bottom untrimmed can body 52. As the star wheels 132 continue to rotate, the guide 136 pushes the untrimmed can body 52 so that the open end thereof moves adjacent to or slightly over the end of the vacuum cup 86. At this location, the radially inner member 64 has rotated a sufficient amount so that the second portion 70 thereof is opposite the radially outer knife 50 so that the open end of the untrimmed can body 52 can pass over the radially outer knife 50. The vacuum cup 86 pulls the can body 52 over the can body supporting means 48 and the radially outer knife 50 until the bottom of the untrimmed can body 52 is against the bottom edge of the vacuum cup 86. Slightly before the 45 degree position on FIG. 7, the member 64 has been rotated so that the leading portion of the knife edge 68 is opposite to the radially outer knife 50 so that the cutting of the untrimmed can body 52 is started. During each 90 degrees of rotation of the main drive shaft 8, the member 64 rotates through 180 degrees and the radially outer knife 50 rotates through 360 degrees. As illustrated in FIG. 3, during the actual cutting operation, the portion of the can body 52 being cut is moved radially inwardly. However, after being cut, the resilient nature of the material and the resilient fingers of the can body supporting means will move the cut end to its original size so that the trimmed can body can be moved over the radially outer knife 50 and the first knurling roller 56. Slightly after the 135 degree position on FIG. 7, the member 64 has rotated so that the second portion 70 is opposite to the radially outer knife 50. The cam follower 98 then contacts the camming surface 96 to move the trimmed away portion 92 and the open end of the trimmed can body 78 over the first knurling roller 56 and then to move the trimmed can body 78 back to its original position. At about the 165 degree position on FIG. 7, the port 28 will move from the compartment 26 applying vacuum to a compartment 26 supplying air under pressure which pressurized air flows through the tubing 31, the rotary union 30 and the hollow elongated shaft 80 to blow the trimmed body 78 off of the can body supporting means 48 and the vacuum cup 86 into a discharge chute 79. At the same time, a portion of the pressurized air flows through the tube 244 to actuate the air cylinder 238 to move the second knurling roller 100 into knurling relationship with the first knurling roller 56 to cut and knurl the trimmed away portion 92. The first and second knurling rollers 56 and 100 are similarly shaped, with the exception of at least one knife edge 246 on the second knurling roller 100, and are rotated at the same speed. At about the 195 degree position on FIG. 7, the port 28 will move away from the compartment 26 supplying the pressurized air. However, conventional means are provided on the air cylinder 236 to hold the piston 240 in the extended position until a vacuum is again applied at about the 315 degree position on FIG. 7. During each revolution of the turret 34, four untrimmed can bodies 52 will be removed from the storage rack 130 and trimmed by the can trimming apparatuses 32 as described above.

In the embodiment of the invention illustrated in FIGS. 1–7, the distance between the axis of rotation of the first shaft 42 and the axis of rotation of the second shaft 58 is about 3.750 inches. The radius of the radially outer knife 50 is slightly greater than 1.250 inches and the radius of the knife edge 68 is slightly greater than 2.50 inches to provide an overlap therebetween during the cutting operation of about 0.0005 inch. These latter dimensions will vary with the diameter of the can being cut. Basically the radially outer knife 50 has a diameter slightly smaller than the inner diameter of the untrimmed can body 52, and the radius of the knife edge 68 is large enough to provide an overlap between the radially outer knife 50 and the knife edge 68 of about 0.0005 inch. Also, spacer 186 is proportioned to provide a side clearance between the radially outer knife 50 and the knife edge 68 of about 0.0003 inch. These close dimensions are possible in view of the positive mountings of the radially outer knife 50 and the knife edge 68 and the relative closeness between the axes of rotation of the first and second shafts 42 and 48. In accordance with this invention, the distance between the axes of rotation of the first and second shafts 42 and 58 is about three times the radius of the radially outer knife 50 with the radius of the knife edge 68 being about twice the radius of the radially outer knife 50. In practice, the radius of the radially outer knife 50 is slightly less than the radius of the untrimmed can body 52 and the radius of the knife edge 68 is slightly larger than twice the radius of the radially outer knife 50 to provide for the overlap of 0.0005 inch. The knife edge 68 has a circumferential extent of at least about 184 degrees to ensure that a complete cut is made in the untrimmed can body 52. This relatively close and fixed relationship of the radially outer knife 50 and the knife edge 68 and the adjusting means for axially locating the untrimmed can bodies cooperate to produce trimmed can bodies of precise axial extent.

Figure 8:
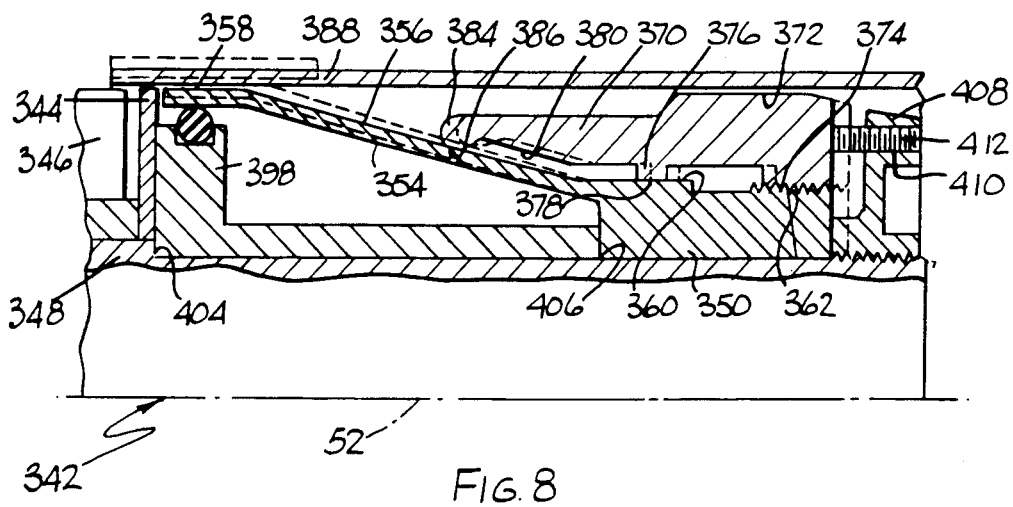
FIG. 8 is a cross-sectional view of a portion of the collapsible mandrel of this invention.
Figure 9:
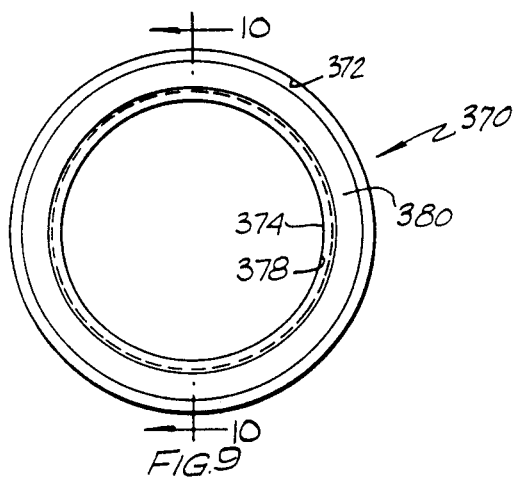
FIG. 9 is a front elevational view of the elongated hollow member.
Figure 10:
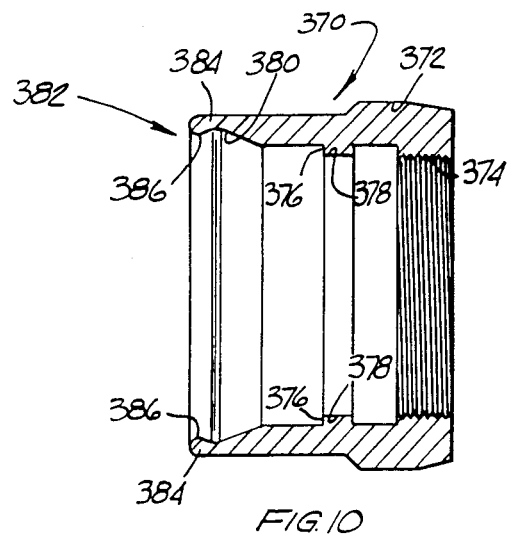
FIG. 10 is a cross-sectional view taken on the line 10—10 of FIG. 9.
Figure 11:
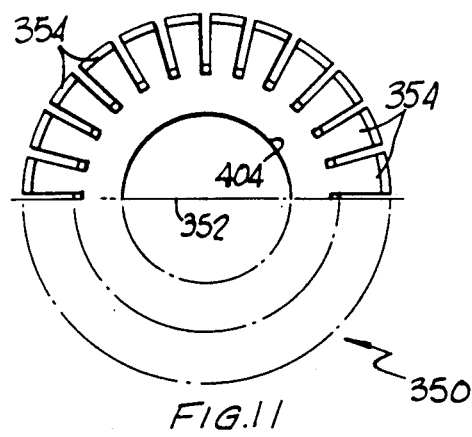
FIG. 11 is a front elevational view of the hollow support members.
Figure 12:
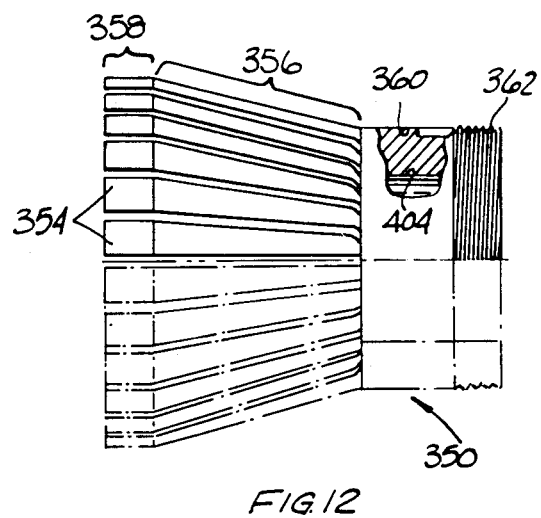
FIG. 12 is a side elevational view with parts in section of FIG. 11.

A preferred collapsible mandrel 342 of this invention is illustrated in FIGS. 8-15. A knife 344 and a knurling roller 346 are mounted on a rotatable shaft 348 for rotation therewith. A hollow support member 350, FIGS. 8, 11 and 12, is mounted on the rotatable shaft 348 at a relatively fixed location for rotation therewith, as described below, and has a longitudinal axis 352 which coincides with the axis of rotation of the rotatable shaft 348. A plurality of integral elongated spaced apart resilient fingers 354 extend therefrom in axial and radially outward directions. The resilient fingers 354 have arcuate outer surfaces and comprise a first part 356 whose outer surfaces are shaped generally as a frustum of a cone and a second part 358 whose outer surfaces are shaped generally as a cylinder. The hollow support member 350 has a generally cylindrical radially outer surface 360 and an externally threaded portion 362. The diameter of the externally threaded portion 362 is equal to or less than the diameter of the generally cylindrical surface 360.

An elongated hollow member 370, having a longitudinal axis coinciding with the longitudinal axis of the hollow support member 350, is illustrated in FIGS. 8-10 and has an outer surface the largest portion thereof comprising a generally cylindrical surface 372 having a diameter slightly smaller than the smallest diameter of the inner peripheral surface of a can body to be moved thereover as described below. The elongated hollow member 370 has an internally threaded portion 374 that is dimensioned to mate with and be engaged with the externally threaded portion 362. A radially inwardly directed projection 376 is formed on the elongated hollow member 370 and has a generally cylindrical inner peripheral surface 378 having a diameter substantially the same as but slightly greater than the diameter of the generally cylindrical outer peripheral surface 360 of the hollow support member 350 for purposes described below. Another portion 380 of the inner peripheral surface of the elongated hollow member 370 has the shape generally of a frustum of a cone with the largest diameter thereof closer to the open end 382. Between the another portion 380 and the open end 382, the elongated hollow member 370 has a knob like portion 384 having a radially inward bearing surface 386 that is round in the radial direction and arcuate in the axial direction.

The hollow support member 350 and the elongated hollow member 370 are assembled by inserting the hollow support member 350 into the elongated hollow member 370. The generally cylindrical outer peripheral surface 360 contacts the generally cylindrical inner surface 378 and guides the movement thereof to ensure that the externally threaded portion 362 contacts the internally threaded portion 374. Rotation of the elongated hollow member 370 secures it onto the hollow support member 350. As illustrated in FIG. 8, when the hollow support member 350 and the elongated hollow member 370 are assembled, the bearing surface 386 contacts the outer surfaces of the first part 356 to limit the radially outward movement of the resilient fingers 354. The resilient fingers 354 are located relative to the externally threaded portion 362, and the bearing surface 386 is located relative to the internally threaded portion 374 so that there will be no contact between the bearing surface 386 and the resilient fingers 354 until at least the internally and externally threaded portions 374 and 362 have formed at least one complete thread. As illustrated by the dotted outline in FIG. 8, as the elongated hollow member 370 is rotated, it moves from a fully closed position linearly in an axial direction from left to right so that the resilient fingers 354 move radially outwardly so as to accommodate can bodies having an inner peripheral surface of a larger diameter. Also, the resilient fingers 354 have sufficient flexibility so that the second parts 358 thereof are in surface to surface contact with portions of the inner peripheral surface of the can body 388. As illustrated in FIG. 2, when the resilient fingers 354 are in their smallest operative position, the cylindrical surface of the second part 358 has a longitudinal axis that coincides with the longitudinal axis of the hollow support member 350. However, if desired, the second part 358 could be a frustum of a cone of a very slight taper with the largest diameter thereof next adjacent to the open end of the resilient fingers 354.

Figure 13:
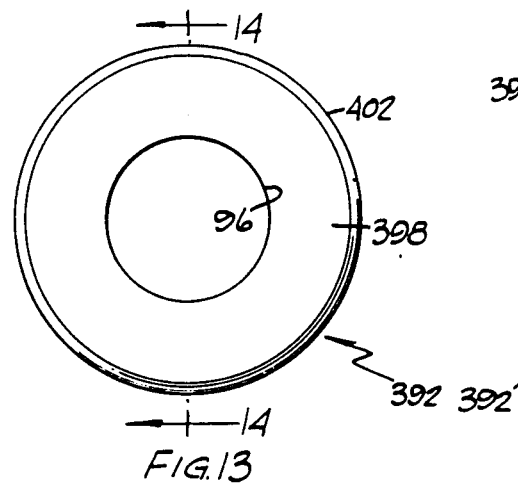
FIG. 13 is a front elevational view of the movement limiting means.
Figure 14:
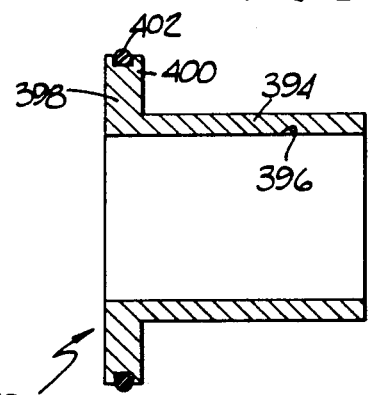
FIG. 14 is a cross-sectional view taken on the line 14—14 of FIG. 13.

In FIGS. 8, 13 and 14, there is illustrated movement limiting means 392 for limiting the radially inward movement of the resilient fingers 354 comprising a body portion 394 having a generally cylindrical inner peripheral surface 396 having a diameter slightly larger than the outer diameter of the shaft 348 so that the body portion 394 may be positioned on the shaft 348. A flange 398 projects radially outwardly from the body portion 394 and has a recess 400 in which is seated a resilient 0-ring 402 to cushion any accidental contact of a resilient finger 354 therewith.

The collapsible mandrel 342 is assembled by inserting the hollow support member 350 into the elongated hollow member 370. The cylindrical surfaces 360 and 378 function to guide the externally threaded surface 362 into contact with the internally threaded surface 374. Rotation of the elongated hollow member 370 makes the threaded engagement thereof on the hollow support member 350. The bearing surface 386 forces the resilient fingers 354 radially inwardly. The movement limiting means 392 are positioned on the shaft 348 and moved into contact with a shoulder 404 on the shaft 348. The hollow support member 350 and the elongated hollow member 370 are positioned on the shaft 348 with the generally cylindrical inner peripheral surface 406 of the hollow support member 350 in contact with the outer peripheral surface of the shaft 348. A nut 408 is threaded onto the end of the shaft 348 and is tightened to bear against the hollow support member 350 to force it against the movement limiting means 392 and the flange 398 against the shoulder 404 on the shaft 348 so as to hold the hollow support member 350 and the elongated hollow member 370 on the shaft 348 for rotation therewith. The diameter of the cylindrical surface of the second part 358 of the resilient fingers may be reduced by the rotation of the elongated hollow member 370 in an amount up to about 0.020 of an inch. A can body 388 from a plurality of can bodies to be trimmed is used to test the location of the resilient fingers 354. If the can body 388 cannot be pushed over the resilient fingers 354, it is removed and the elongated hollow member 370 is rotated to move the resilient fingers 354 radially inwardly. The process is repeated until the can body 388 can be readily moved over the resilient fingers 354 but will compress them in a sufficient amount so that the surface to surface contacts between the second parts 358 and the inner peripheral surface of the can body 388 will hold the can body 388 on the resilient fingers 354 for rotation therewith. Locking means are provided to prevent the rotation of the elongated hollow member 370 and comprise a pair of spaced apart threaded openings 410 in the nut 408 extending in an axial direction and a set screw 412 in each of the threaded openings 410 so that, when the set screws 412 are tightened, they bear against the elongated hollow member 370 to prevent rotation thereof.

Figure 15:
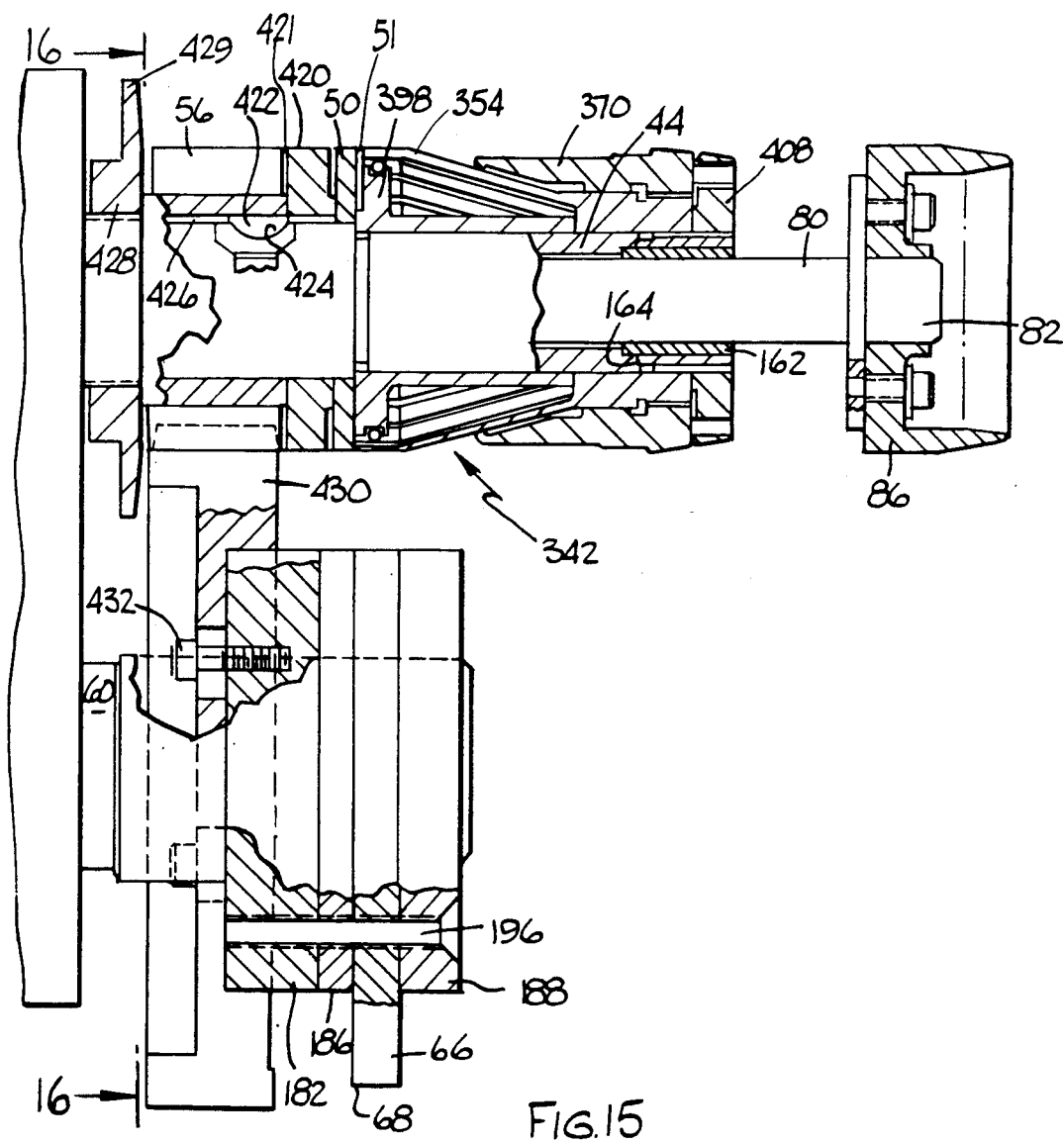
FIG. 15 is a side elevational view with parts in section of another preferred embodiment of the cutter and knurler assemblies of this invention.
Figure 16:
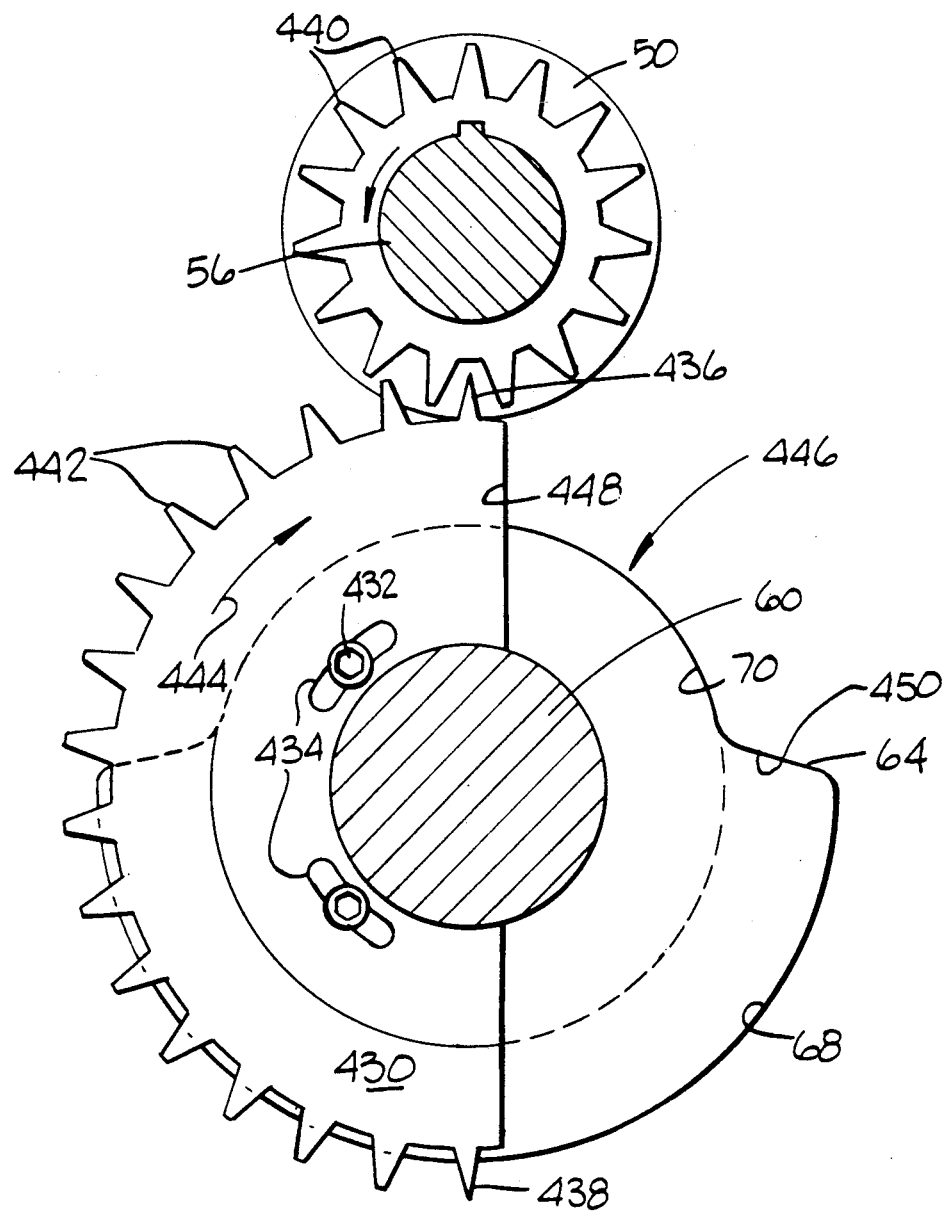
FIG. 16 is a cross-sectional view taken on the line 16—16 of FIG. 15.
Figure 17:
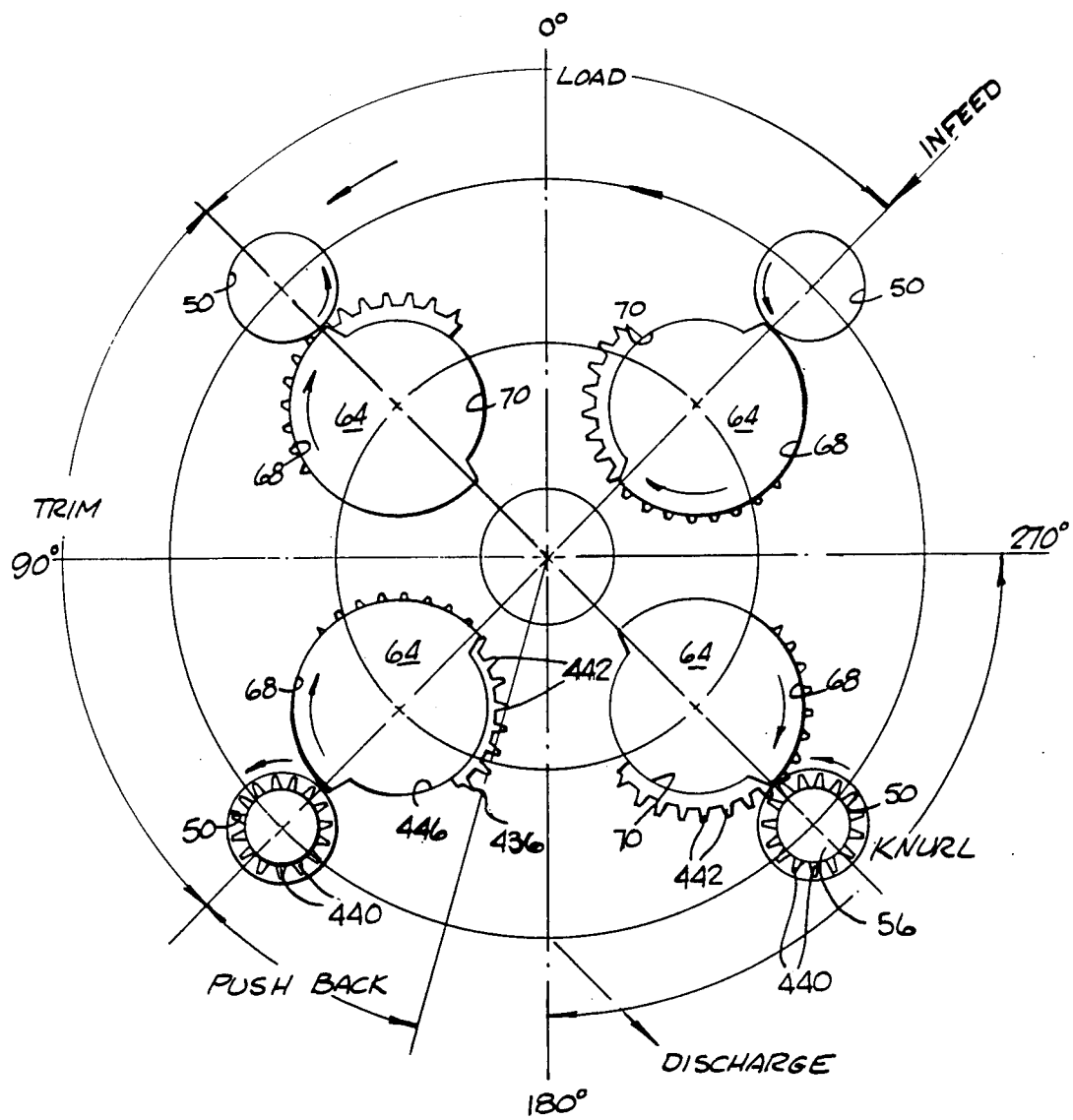
FIG. 17 is a schematic illustration of the relative positions of the cutting knives and knurling rollers during each revolution of the turret.

Another preferred knurling apparatus for cutting and knurling the trimmed away portion 92 is illustrated in FIGS. 15-17. Where apparatus in FIGS. 15-17 corresponds to similar apparatus in FIGS. 1-4, the same reference numerals have been used. A collapsible mandrel 342 is secured on the second end portion 44 of the first shaft 40 by the nut 408 threaded onto the second end portion 44. The radially outer knife 50 or 344 is mounted on the end portion 44. An annular spacer 420 is mounted on the end portion 44 and, as described below, is adapted to be moved into contact with the radially outer knife 50 or 344 and to be located axially inwardly therefrom. The first knurling roller 56 is mounted on the end portion 44 using a key 422 seated in an arcuate slot 424 in the end portion 44. The key also has a portion located in an axially extending slot 426 in the knurling roller 56 so that the knurling roller 56 rotates with the end portion 44 but also can be moved in axial directions relative thereto. A clamping nut 428 is threadedly mounted on the end portion 44 and bears against a portion of the knurling roller 56. When the clamping nut 428 is fully tightened, the knurling roller 56, the annular spacer 420 and the radially outer knife 50 or 344 are clamped between the flange 398 and the clamping nut 428. The flange 429 on the clamping nut 428 acts as a scrap deflector.

The annular shim member 186, the annular member 66 and the annular clamping member 188 are secured by bolts 196 to the flange 182 integral with the end portion 60. A second knurling roller 430, having a peripheral extent slightly greater than 180 degrees, is secured to the flange 182 by a plurality of headed threaded bolts 432 which pass through arcuate slots 434 and are threaded into threaded openings (not shown) in the flange 182. The arcuate slots 434 permit rotational adjustment of the second knurling roller 430. Knife edges 436 and 438 are provided on the second knurling roller 430 to ensure that the trimmed away portion 92 will be cut. The teeth 440 on the first knurling roller 56 and the teeth 442 on the second knurling roller 430 cooperate to knurl the trimmed away portion 92. As illustrated in FIG. 16, the second knurling roller 430 rotates in the direction indicated by the arrow 444. A portion 446 of the second portion 70 of the member 64 exists between the leading edge 448 of the second knurling roller 430 and the trailing edge 450 of the knife edge 68 which portion 446 permits the trimmed away portion 92 to be pushed over the first knurling roller 56 by the moving means 90 as described above. Annular spacer 420 has an axial extent, as illustrated in FIG. 15, so that the axial distance between the cutting edge 51 of the radially outer knife 50 and the axial inner extremity 421 of the annular spacer 420 closest to the first knurling roller 56 is greater than the axial extent of the greatest possible trimmed away portion 92 so that the second knurling roller 430 can only contact the portion of the can body to be trimmed away only after it has been positioned over the first knurling roller 56.

As stated above, the outer diameter of the first knurling roller 56 is slightly less than the outer diameter of the radially outer knife 50. In one example, the outer diameter of the radially outer knife was in the range of between about 2.455 and 2.456 inches and the outer diameter of the knurling roller 56 was in the range of between about 2.448 and 2.453 inches. The annular spacer 420 has a tapered outer surface with the portion thereof abutting the radially outer knife 50 having a diameter slightly less than the outer diameter of the radially outer knife and the portion thereof abutting the knurling roller 56 having a diameter slightly greater than the outer diameter of the knurling roller 56 to ensure that the trimmed away portion 92 can be pushed over the knurling roller 56. In the same example, the knife edge 68 of the member 64 has a radius of 2.5284 inches and the knurling roller 430 has a radius of about 2.789 inches.

The operation of the apparatus illustrated in FIGS. 15 and 16 is schematically illustrated in FIG. 17. This operation from the 315 degree position to the 135 degree position is the same as that described above in relation to FIG. 7. Slightly after the 135 degree position in FIG. 17, the member 64 and the knurling roller 430 have rotated so that the portion 446 is opposite to the trimmed away portion 92. The cam follower 98 then contacts the camming surface 96 to move the trimmed away portion 92 and the open end of the trimmed can body 78 over the annular spacer 420 until it is over the first knurling roller 56 and then to move the trimmed can body 78 back to its original position. The camming surface 96 for the apparatus of FIGS. 15 and 16 is greater than the camming surface 96 for the apparatus of FIGS. 1 and 3 since the trimmed away portion 92 must be moved a greater distance to ensure that it is over the first knurling roller 56 and not over the annular spacer 420. At about the 180 degree position, the knife edge 436 contacts the trimmed away portion 92 and severs it and the teeth 440 and 442 begin the knurling operation which is completed by the 270 degree position. As described above in relation to FIG. 7, the trimmed can body 78 will be removed at about the 165 degree position.

Figure 18:
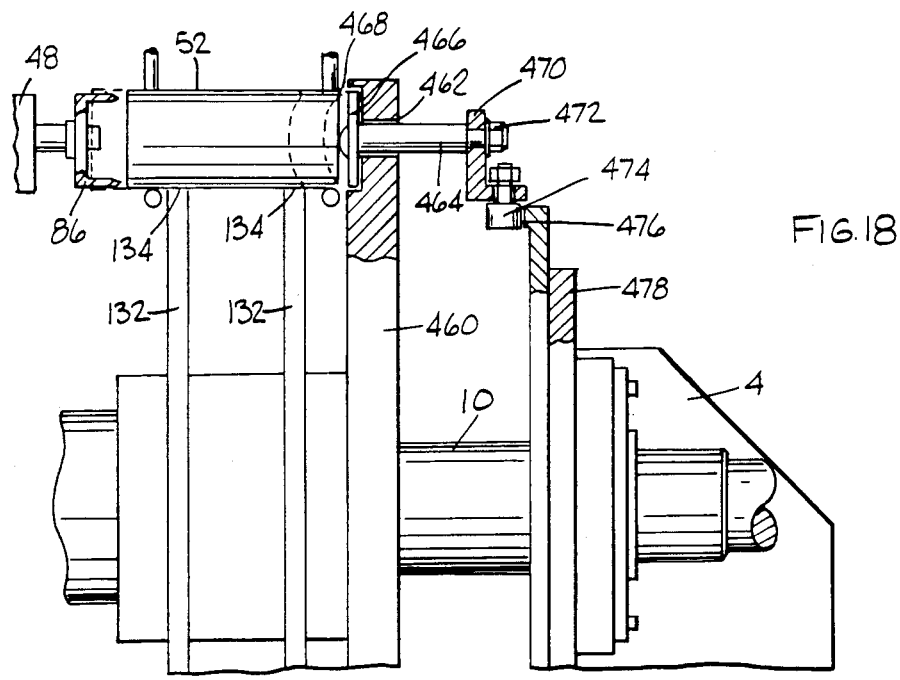
FIG. 18 is a schematic illustration of another embodiment of apparatus for loading untrimmed can bodies.
Figure 20:
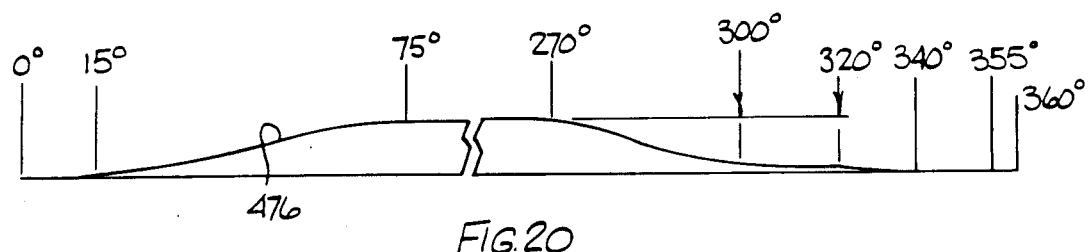
FIG. 20 illustrates the cam profile for the apparatus of FIG. 18.
Figure 19:
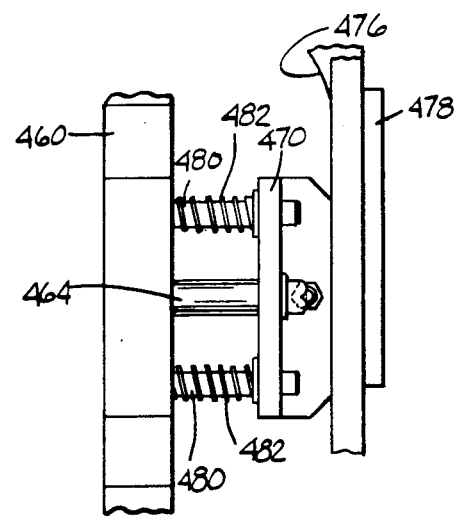
FIG. 19 is a top plan view of a portion of FIG. 18.

Another embodiment of apparatus for loading the untrimmed can bodies 52 is illustrated in FIGS. 18-20 and comprises an annular member 460 mounted on the main drive shaft 10 for rotation therewith. The annular member 460 has a plurality of circumferentially, spaced apart openings 462 (only one of which is shown) having a longitudinal axis aligned with the longitudinal axis of the can body supporting means 48. The openings 462 correspond in number with the pockets 134 of the star wheels 132 and are aligned therewith. A shaft 464 is mounted for sliding reciprocating movement through an opening 462. At one end the shaft has a flange portion 466 for contacting the annular rim portion 468 of the closed end of the untrimmed can body. An L-shaped support member 470 is secured to the other end of the shaft 464 by a threaded nut 472. A cam follower 474 is rotatably mounted on the L-shaped support member 470 and is located to contact the cam surface 476. The cam surface 476 is formed on an annular support member 478 fixedly mounted on the bearing block 4. A pair of spaced apart posts 480 are fixedly mounted on the annular member 460 and are located on either side of the shaft 464 and are parallel thereto. The L-shaped support member 470 is slidably mounted on the posts 480 and resilient spring means 482 urge the L-shaped support member outwardly so that the cam follower 474 is urged into contact with the cam surface 476.

Figure 21:
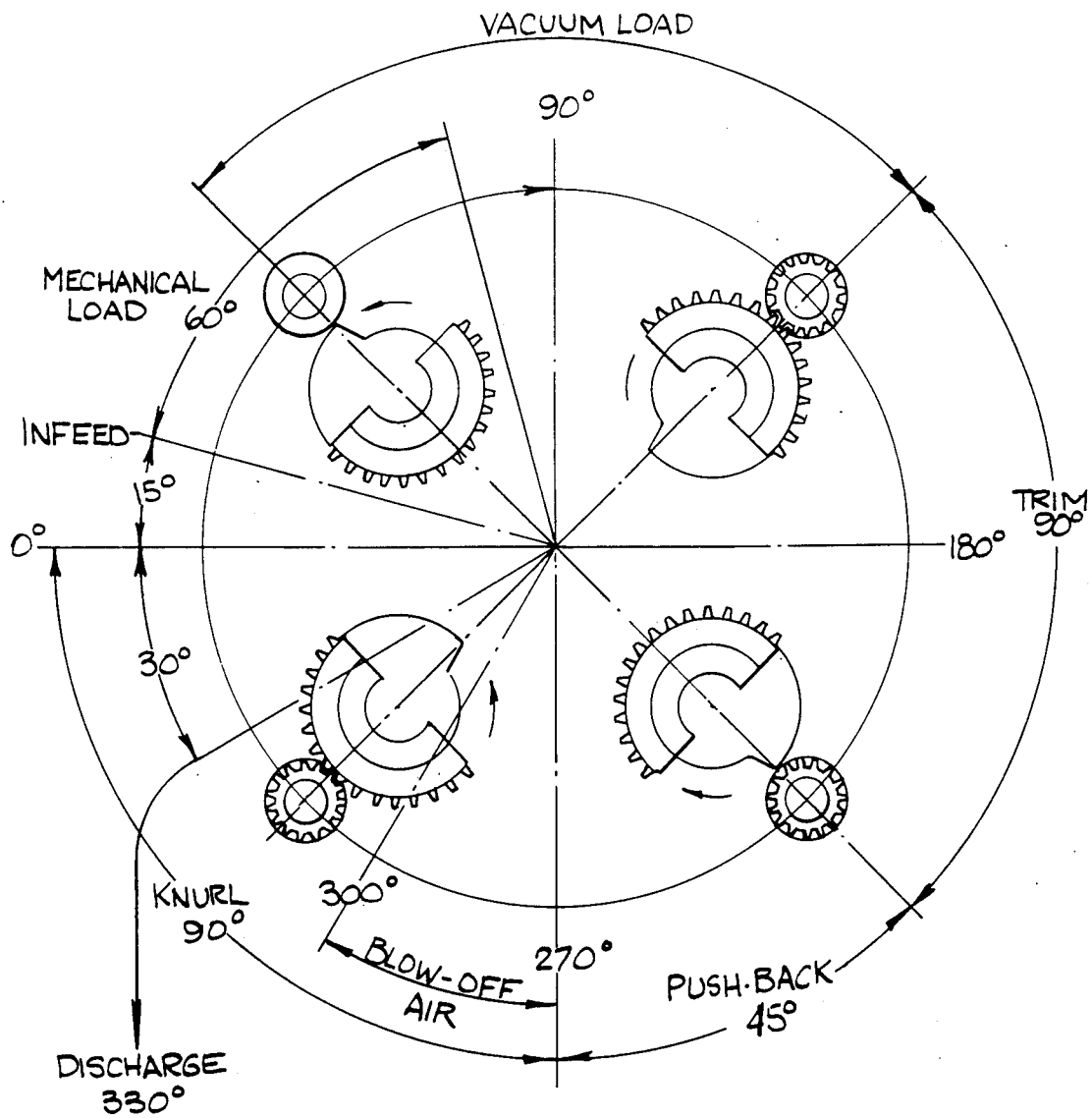
FIG. 21 is a schematic illustration of the operation of the loading and unloading apparatus in association with another cycle of operation of the apparatus of this invention.

The operation of the loading apparatus is explained in relation to the schematic illustration in FIG. 2 of the apparatus of this invention operating in a clockwise direction. The 0 degree location on FIGS. 20 and 21 represent the position at which the shaft 464 is in a fully retracted position. Immediately after the infeed of the untrimmed can body 52 at the 15 degree location, the cam surface 476 starts to move the shaft 464 and the flange portion toward the untrimmed can body 52. The original position of the untrimmed can body 52 in the pockets 134 is illustrated by the solid outline in FIG. 18. The cam surface 476 continues to move the shaft 464 and the flange portion 466 until it contacts the annular rim portion 468 and moves the untrimmed can body 52 toward and over the vacuum cup 86. This movement is continued to the 75 degree location on FIGS. 20 and 21. At the 45 degree location, the vacuum means are actuated to gradually apply a vacuum on the vacuum cup 86 to pull the untrimmed can body over the can body supporting means 48 at someplace between the 45 degree and 75 degree locations. The cam surface 476 keeps the shaft 464 and the flange portion 466 at this location until the push-back operation begins at about the 225 degree location. Slightly before the 270 degree location, the pressurized air is blown through the vacuum cup 86 to move the trimmed can body 78 against the flange portion 466. The cam surface 476 then starts to permit the shaft 464 and the flange portion 466 to move back away from the vacuum box 86 while the pressurized air retains the trimmed can body 78 in contact with the flange portion 466. At about the 300 degree location, the retracting movement of the trimmed can body 78, the shaft 464 and the flange portion 466 is stopped and the pressurized air is cut off and the trimmed can body 78 is properly located in the pockets 134 to be removed as described below. At about the 320 degree location, the cam surface 476 permits the shaft 464 and the flange portion 466 to move back to their original positions.

Figure 22:
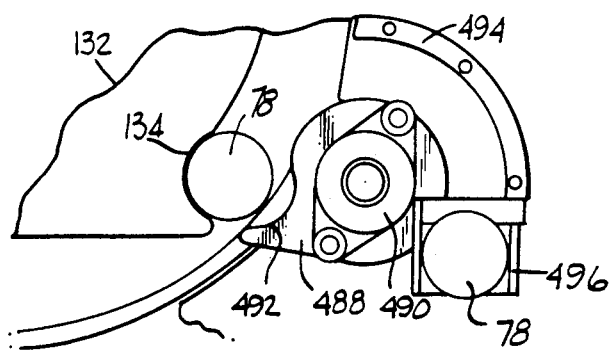
FIG. 22 is a schematic illustration of apparatus for unloading trimmed can bodies.

The apparatus for removing a trimmed can body 78 is illustrated schematically in FIG. 22. A pair of axially spaced apart star wheels 488 are mounted for rotation on a fixed support 490. Each of the star wheels 488 has at least one pocket 492 dimensioned so as to accommodate a trimmed can body 78. As the star wheel 132 approaches the 330 degree location on FIG. 21, the star wheels 488 move the pockets 492 into contact with the trimmed can body 78. The star wheels 488 are rotated so that their peripheral velocity is greater than the peripheral velocity of the star wheel 132 so that the pockets 492 lift the trimmed can body 78 off of the pockets 132. Slightly before the vertical, the trimmed can body 78 in the pockets 492 contacts a fixedly mounted guide brush 494 which urges the trimmed can body 78 against the pockets 492. The movement of the trimmed can body 78 continues until it is over the discharge chute 496 at which location it is discharged into the the discharge chute 496 for further processing operations.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for trimming away a portion of a can body having an uneven edge on the open end thereof to form a can body of a desired axial extent comprising:
    a support structure;
    a main drive shaft rotatably mounted on said support structure;
    drive means for rotating said main drive shaft;
    a turret having a plurality of mounting surfaces secured to said main drive shaft for rotation therewith;
    a can processing apparatus removably mounted on each of at least two of said mounting surfaces for rotation with said turret;
    loading and unloading means for loading an untrimmed can body having an uneven edge on the open end thereof onto each of said can processing apparatuses and removing a trimmed can body from each of said can processing apparatuses; and
    each of said can processing apparatuses having a can trimming apparatus having cutting means for trimming away a portion of said can body having said uneven edge and knurling apparatus having cutting and knurling means for cutting and knurling said trimmed away portion of said can body.

2. Apparatus as in claim 1 wherein each of said can processing apparatuses comprises:
    a housing mounted on said mounting surface;
    a first shaft rotatably mounted in said housing and having first and second end portions and a relatively fixed central axis of rotation;
    can body supporting means mounted on said first end portion for rotation therewith for supporting said untrimmed can body;
    said can trimming apparatus having first cutting means comprising a radially outer knife mounted at a fixed location on said first end portion of said first shaft for rotation therewith and located axially inwardly from said can body supporting means;
    said can body supporting means supporting said untrimmed can body so that said radially outer knife is located within said untrimmed can body;
    said knurling apparatus having a first knurling roller mounted on said first shaft for rotation therewith and having an axial extent greater than said portion to be trimmed away and having said uneven edge;
    a second shaft rotatably mounted in said housing and having first and second end portions and having a relatively fixed central axis of rotation which is substantially parallel to said central axis of rotation of said first shaft;

said second shaft being located radially inwardly from said first shaft;

said can trimming apparatus having second cutting means comprising a member mounted at a fixed location on said first end portion of said second shaft for rotation therewith and having a peripheral surface having a first arcuate portion and a second arcuate portion;

said first arcuate portion having a knife edge formed thereon and having a radius great enough so that it can contact the outer surface of said untrimmed can body and cooperate with said radially outer knife to trim said portion having said uneven edge from said untrimmed can body;

said second arcuate portion having a radius sufficiently less than said radius of said knife edge so that an untrimmed can body may be positioned on said can body supporting means;

moving means for moving the trimmed away portion of said can body and the trimmed can body in an axial direction over said first knurling roller and then moving only said trimmed can body back in the opposite axial direction so that no portion thereof is over said first knurling roller;

drive means mounted on said frame for rotating said first and second shafts; and said knurling apparatus having a second knurling roller mounted on said first end portion of said second shaft at a location spaced axially inwardly from said member and cooperating with said first knurling roller to cut and knurl said trimmed away portion.

3. Apparatus as in claim 2 wherein:

said central axis of rotation of said second shaft is spaced a distance from said central axis of rotation of said first shaft that is about three times the radius of said radially outer knife and said knife edge has a radius slightly greater than twice said radius of said radially outer knife and has a circumferential extent of at least about 184 degrees.

4. Apparatus as in claim 2 and further comprising:

star wheel means mounted on said main drive shaft for rotation therewith;

said star wheel means having a peripheral surface having a plurality of pocket means formed therein for receiving an untrimmed can body having an uneven edge on the open end thereof and wherein said pocket means correspond in number to the number of can trimming apparatuses mounted on said turret;

storage rack means for holding a plurality of untrimmed can bodies, each having an uneven edge on the open end thereof for automatically feeding an untrimmed can body into one of said pocket means; and guide means for moving an untrimmed can body in said pocket means onto said loading means.

5. Apparatus as in claim 2 and further comprising:

adjusting means for adjusting said loading means in axial directions so that trimmed can bodies of a desired axial extent may be produced.

6. Apparatus as in claim 5 wherein said moving means comprises:

a cam fixedly mounted on said support structure and having a camming surface; and a cam follower mounted on each of said can trimming apparatuses so as to contact said camming surface during only a portion of each revolution of said adjusting means to move said can body supporting means in axial directions.

7. Apparatus as in claim 6 wherein said adjusting means comprises:

a hollow elongated shaft slidably mounted in said first shaft for linear movement in axial directions and having a first end portion and a second end portion;

said loading means comprising vacuum means on said first end portion of said elongated shaft for pulling an untrimmed can body onto said can body supporting means so that the closed bottom end of said untrimmed can body is against said vacuum means;

an externally threaded portion on said second end portion of said elongated shaft;

an adjusting nut threadedly mounted on said externally threaded portion for varying the distance between said adjusting nut and said vacuum means;

resilient means urging said hollow elongated shaft in an axial direction away from said second end portion toward said first end portion;

stop means for limiting the movement of said adjusting nut and said hollow elongated shaft in said axial direction; and locking means for holding said adjusting nut at a desired location.

8. Apparatus as in claim 2 and further comprising:

pivotal mounting means for mounting said second knurling roller on said first end portion of said second shaft for pivotal movement into and out of engagement with said first knurling roller.

9. Apparatus as in claim 8 and further comprising:

said first and second knurling rollers being similarly shaped for meshing engagement; and drive means for rotating said second knurling roller at the same rotational speed as said first knurling roller.

10. Apparatus as in claim 9 wherein said pivotal mounting means comprises:

a pair of axially spaced apart bearings, each having an inner member and a relatively rotatable outer member;

each of said inner members being secured to said first end portion of said second shaft;

a plate member secured to each of said outer members for rotation therewith;

connecting means for connecting said plate members together so that rotational movement of one plate member causes the same rotational movement of the other plate member;

a first axle rotatably mounted on said plate members;

drive means for rotating said first axle;

said second knurling roller being mounted on said first axle for rotation therewith; and force applying means for applying a force to at least one of said plate members to rotate said plate member and move said second knurling roller into or out of engagement with said first knurling roller.

11. Apparatus as in claim 10 wherein said force applying means comprises:

a support member fixedly mounted on said housing; and an air cylinder mounted on said support member and rotatably connected to said at least one of said plate members.

12. Apparatus as in claim 11 wherein said drive means for rotating said second knurling roller at the same rotational speed as said first knurling roller comprises:
   a first gear mounted on said first end portion of said second shaft for rotation therewith and located between said pair of axially spaced apart bearings;
   a second gear mounted on said first axle for rotation therewith; and
   a second axle mounted on said plate members;
   a third gear rotatably mounted on said second axle and in mesh with said first and second gears so that rotation of said first gear rotates said third gear to rotate said second gear and said first axle and said second knurling roller.

13. Apparatus as in claim 12 and further comprising:
   adjusting means for adjusting said knife edge in axial directions so that it will properly mate with said radially outer knife to trim away said portion of said untrimmed can body having said uneven edge.

14. Apparatus as in claim 2 wherein said drive means for rotating said first and second shafts comprises:
   a stationary gear mounted on said support structure;
   a first gear mounted on said second end portion of said first shaft so that rotation of said first gear rotates said first shaft;
   said first gear being in mesh with said stationary gear so that rotation of said turret rotates said first gear;
   a second gear mounted on said second end portion of said first shaft for rotation therewith;
   a third gear mounted on said second end portion of said second shaft so that rotation of said third gear rotates said second shaft; and
   said third gear being in mesh with said second gear to that rotation of said first shaft rotates said second shaft.

15. Apparatus as in claim 2 wherein said moving means comprises:
   a cam fixedly mounted on said support structure and having a camming surface adapted to be contacted by a cam follower;
   a cam follower; and
   first mounting means for mounting said cam follower on each can trimming apparatus for contacting said camming surface during only one portion of each revolution of said can trimming apparatus.

16. Apparatus as in claim 15 wherein said first mounting means comprises:
   a hollow elongated shaft, having a first end portion and a second end portion;
   second mounting means for mounting said elongated shaft on said first shaft to permit reciprocal sliding movement of said elongated shaft in axial directions relative to said first shaft, said first knurling roller, said upper knife and said can holding means and to provide relative rotational movement between said elongated shaft and said first shaft;
   a portion of said loading means secured to said first end portion of said hollow elongated shaft for movement therewith;
   resilient means for urging said hollow elongated shaft in an axial direction away from said second end portion and toward said first end portion thereof;
   stop means for limiting the movement of said elongated shaft in said axial direction; and
   said first mounting means mounting said cam follower on said second end portion of said elongated shaft so that when said cam follower moves over said camming surface, it first moves said elongated shaft in an axial direction away from said first end portion and toward said second end portion to move said trimmed away portion and said trimmed can body over said first knurling roller and then permit said resilient means to move said elongated shaft to return said trimmed can body back to its original position and leaving said trimmed away portion on said first knurling roller.

17. Apparatus as in claim 16 and further comprising:
   rotation preventing means for preventing rotation of said elongated shaft.

18. Apparatus as in claim 17 and further comprising:
   star wheel means mounted on said main drive shaft for rotation therewith;
   said star wheel means having a peripheral surface having a plurality of pocket means formed therein for receiving an untrimmed can body having an uneven edge on the open end thereof and wherein said pocket means correspond in number to the number of can trimming apparatuses mounted on said turret;
   storage rack means for holding a plurality of untrimmed can bodies having an uneven edge on the open ends thereof for automatically feeding a can body into said pocket means; and
   guide means for moving an untrimmed can body in said pocket means onto said loading means.

19. Apparatus as in claim 2 and further comprising:
   a collapsible mandrel on said can body supporting means.

20. Apparatus as in claim 19 wherein said collapsible mandrel comprises:
   a hollow support member having a longitudinal axis;
   an elongated hollow member having a longitudinal axis;
   mounting means for mounting said hollow support member and said elongated member on a rotatable shaft of a can body trimming apparatus for rotation therewith;
   a plurality of resilient fingers extending axially and radially outwardly from said hollow support member and having portions adapted to contact portions of the inner peripheral surface of a can body to hold said can body for rotation therewith;
   bearing means on said elongated hollow member for contacting said resilient fingers so as to limit the radially outward extent thereof; and
   adjustable coupling means for joining together said hollow support member and said elongated hollow member so that said longitudinal axes coincide and for permitting relative movement between said hollow support member and said elongated hollow member for controlling the contacting relationship between said bearing means and said resilient fingers so as to control the radially outward extent of said resilient fingers.

21. Apparatus as in claim 2 and further comprising:
   star wheel means mounted on said main drive shaft for rotation therewith;
   said star wheel means having a peripheral surface having a plurality of pocket means formed therein for receiving an untrimmed can body having an uneven edge on the open end thereof and wherein said pocket means correspond in number to the number of can trimming apparatuses mounted on said turret;
   storage rack means for holding a plurality of untrimmed can bodies, each having an uneven edge on the open end thereof for automatically feeding a can body into one of said pocket means;

an annular member mounted on said main shaft for rotation therewith;

a plurality of moving means for moving said untrimmed can body in said pocket means toward said loading means to be loaded thereon mounted on said annular member for rotation therewith; and said moving means cooperating with said unloading means to reposition said trimmed can body in said pocket means.

22. Apparatus in claim 21 wherein said moving means comprises:

said annular member having a plurality of circumferentially spaced apart axially extending openings formed therein;

each of said openings being aligned with one of said pocket means;

a rod mounted for sliding movement in each of said openings;

a can body contacting member mounted on one end of said rod; and force applying means acting on the other end of said rod to reciprocate said rod in linear directions through said opening.

23. Apparatus as in claim 22 wherein said force applying means comprises:

an annular fixed cam surface surrounding and equally spaced from said main shaft;

a rotatable cam follower mounted on said other end of said rod; and resilient means for applying a force on said cam follower to maintain said cam follower in contact with said cam surface.

24. Apparatus as in claim 23 wherein said loading and unloading means comprise:

a vacuum source for applying a vacuum on the inside of said untrimmed can body to pull said untrimmed can body onto said can body supporting means into a position to be trimmed; and a source of pressurized air for blowing pressurized air into said trimmed can body to move said trimmed can body off of said can body supporting means.

25. Apparatus as in claim 24, wherein:

said cam surface positioning said can body contacting member at a first location to permit said untrimmed can body to be fed into said pocket means;

said cam surface moving said can body contacting member toward said can body supporting means to positively move said untrimmed can body to a second location over said can body supporting means so that said vacuum source will pull said untrimmed can body over said can body supporting means;

said cam surface holding said can body contacting member at said second location while said untrimmed can body is being trimmed;

said cam surface moving said trimmed can body to a third location in said pocket means while said pressurized air holds said trimmed body against said can body contacting member; and said cam surface moving said can body contacting member back to said first location after said pressurized air has been cut off.

26. Apparatus as in claim 1 wherein each of said can processing apparatuses comprises:

a support structure;

a first shaft rotatably mounted on said support structure and having first and second end portions and a central axis of rotation;

can body supporting means mounted on said first end portion for rotation therewith for supporting said untrimmed can body;

a radially outer knife mounted at a fixed location on said first end portion of said first shaft for rotation therewith and located axially inwardly from said can body supporting means;

said can body supporting means supporting said untrimmed can body so that said radially outer knife is located within said untrimmed can body;

an annular spacer mounted at a fixed location on said first end portion of said first shaft for rotation therewith and located axially inwardly from said radially outer knife;

a first knurling roller mounted on said first end portion of said first shaft for rotation therewith and located axially inwardly from said annular spacer;

said annular spacer having an axial extent so that the axial distance between the cutting edge of said radially outer knife and the axial extremity of said annular spacer closest to said first knurling roller is greater than the axial extent of said portion to be trimmed away;

a second shaft rotatably mounted in said housing and having first and second end portions and having a central axis of rotation which is substantially parallel to said central axis of rotation of said first shaft;

a member mounted at a fixed location on said first end portion of said second shaft for rotation therewith and having a peripheral surface;

said peripheral surface having at least a first arcuate portion having a knife edge formed thereon and having a radius great enough so that it can contact the outer surface of said untrimmed can body and cooperate with said radially outer knife to trim said portion having said uneven edge from said untrimmed can body;

said peripheral surface having at least a second arcuate portion having a radius sufficiently less than said diameter of said knife edge so that an untrimmed can body may be positioned on said can body supporting means;

moving means for moving the trimmed away portion of said can body and the trimmed can body in an axial direction over said annular spacer and at least a portion of said first knurling roller and then moving only said trimmed can body back in the opposite axial direction so that no portion thereof is over said first knurling roller;

drive means mounted on said frame for rotating said first and second shafts; and a second knurling roller mounted on said first end portion of said second shaft for rotation therewith and cooperating with said first knurling roller to cut and knurl said trimmed away portion.

27. A method for trimming away a portion of a can body having an uneven edge on the open end thereof to form a can body of a desired axial extent comprising:

rotatably mounting a main drive shaft having a longitudinal axis on support structure;

securing a turret having a plurality of mounting surfaces on said main drive shaft for rotation therewith;

removably securing a can trimming apparatus on each of said mounting surfaces for rotation therewith;

rotating said main drive shaft;

feeding an untrimmed can body having an open end having an uneven edge to each of said can trimming apparatuses during the rotation thereof;

cutting each of said untrimmed can bodies to form a trimmed can body and a trimmed away portion;

removing said trimmed can body from said can trimming apparatus; and moving said trimmed can body and said trimmed away portion in an axial direction parallel to the longitudinal axis of said main drive shaft; and moving only said trimmed can body in an opposite axial direction back to its original position prior to removing said trimmed can body from said can trimming apparatus and cutting, knurling and disposing of said trimmed away portion.

28. Apparatus for trimming away a portion of a can body having an uneven edge on the open end thereof to form a can body of a desired axial extent and for cutting and knurling the trimmed away portion comprising:

a support structure;

a first shaft rotatably mounted on said support structure and having first and second end portions and a central axis of rotation;

can body supporting means mounted on said first end portion for rotation therewith for supporting said untrimmed can body;

a first knife mounted at a fixed location on said first end portion of said first shaft for rotation therewith and located axially inwardly from said can body support means;

said can body supporting means supporting said untrimmed can body so that said first knife is located within said untrimmed can body;

an annular spacer mounted at a fixed location on said first end portion of said first shaft for rotation therewith and located axially inwardly from said first knife;

a first knurling roller mounted on said first end portion of said first shaft for rotation therewith and located axially inwardly from said annular spacer;

said annular spacer having an axial extent so that the distance between the cutting edge of said first outer knife and the axial extremity of said annular spacer closest to said first knurling roller is greater than the axial extent of said portion to be trimmed away;

a second shaft rotatably mounted in said housing and having first and second end portions and having a central axis of rotation which is substantially parallel to said central axis of rotation of said first shaft;

a member mounted at a fixed location on said first end portion of said second shaft for rotation therewith and having a peripheral surface;

said peripheral surface having at least a first arcuate portion having a knife edge formed thereon and having a radius great enough so that it can contact the outer surface of said untrimmed can body and cooperate with said radially outer knife to trim said portion having said uneven edge from said untrimmed can body;

said peripheral surface having at least a second arcuate portion having a radius sufficiently less than said diameter of said knife edge so that an untrimmed can body may be positioned on said can body supporting means;

moving means for moving the trimmed away portion of said can body and the trimmed can body in an axial direction over said annular spacer and at least a portion of said first knurling roller and then moving only said trimmed can body back in the opposite axial direction so that no portion thereof is over said first knurling roller;

drive means mounted on said frame for rotating said first and second shafts; and a second knurling roller mounted on said first end portion of said second shaft for rotation therewith and cooperating with said first knurling roller to cut and knurl said trimmed away portion.

29. Apparatus as in claim 28 and further comprising:

clamping means for clamping together said first knurling roller, said annular spacer and said first knife for rotation with said first shaft.

30. Apparatus as in claim 29 and further comprising:

a recess formed in said first portion of said first shaft;

a key having a portion thereof in said recess to prevent relative movement between said key and said recess;

said first knurling roller having a generally cylindrical inner surface;

an axially extending groove formed in said generally cylindrical inner surface; and another portion of said key in said groove so that said first knurling roller will rotate with said first shaft and have axial linear movement relative thereto.

31. Apparatus as in claim 28 and further comprising:

said second knurling roller having at least one knife edge located so as to be the first portion of said second knurling roller to contact said trimmed away portion.

32. Apparatus as in claim 31 and further comprising:

adjustable mounting means for adjustably mounting said second knurling roller on said second shaft.

33. Apparatus as in claim 32 wherein said second knurling roller comprises:

a body portion having an arcuate outer surface; and a plurality of knurling teeth projecting radially outwardly from said arcuate outer surface.

34. Apparatus as in claim 33 wherein said adjustable mounting means comprises:

a plurality of arcuately shaped slots extending through said body portion;

each of said arcuately shaped slots having a radius that is concentric with the radius of said arcuate outer surface;

an annular flange portion on said first shaft having a plurality of threaded openings formed therein; and a plurality of headed threaded bolts each of which extends through one of said arcuate slots and is threaded into one of said threaded opening so that when said threaded bolts are tightened, said second knurling roll will be clamped between said heads of said headed threaded bolts and said flange.

35. Apparatus as in claim 33 and further comprising:

said body portion having an arcuate extent less than 360 degrees so that said body portion has a leading edge in the direction of rotation;

said knife edge having a trailing edge in the direction of rotation; and said body portion being mounted on said flange portion so that said leading edge thereof is spaced an arcuate distance from said trailing edge of said knife edge so that said trimmed away portion and said trimmed can body can be pushed over said annular spacer and said first knurling roller.

36. Apparatus for trimming away a portion of a can body having an uneven edge on the open end thereof to form a can body of a desired axial extent comprising:
   a support structure;
   a main drive shaft rotatably mounted on said support structure;
   drive means for rotating said main drive shaft;
   a turret having a plurality of mounting surfaces secured to said main drive shaft for rotation therewith;
   a can processing apparatus removably mounted on each of at least two of said mounting surfaces for rotation with said turret;
   loading and unloading means for loading an untrimmed can body having an uneven edge on the open end thereof onto each of said can processing apparatuses and removing a trimmed can body from each of said can processing apparatuses;
   each of said can processing apparatuses having first and second cutting means for trimming away a portion of said untrimmed can body;
   said second cutting means having space forming means for forming a space between said first and second cutting means to provide for said loading of said untrimmed can body and said unloading of said trimmed can body;
   each of said can processing apparatuses having knurling means for cutting and knurling said trimmed away portion; and
   said knurling means being separate from and not attached to either of said first or second cutting means.

37. Apparatus for trimming away a portion of a can body having an uneven edge on the open end thereof to form a can body of a desired axial extent comprising:
   a support structure;
   a main drive shaft rotatably mounted on said support structure;
   drive means for rotating said main drive shaft;
   a turret having a plurality of mounting surfaces secured to said main drive shaft for rotation therewith;
   a can processing apparatus removably mounted on each of at least two of said mounting surfaces for rotation with said turret;
   loading and unloading means for loading an untrimmed can body having an uneven edge on the open end thereof onto each of said can processing apparatuses and removing a trimmed can body from each of said can processing apparatuses;
   each of said can processing apparatuses having first and second cutting means for trimming away a portion of said untrimmed can body;
   said second cutting means having a peripheral surface having a first arcuate portion and a second arcuate portion;
   said first arcuate portion comprising a knife edge for cooperating with said first cutting means in trimming away said portion of said untrimmed can body;
   said second arcuate portion providing a space between said first cutting means and said second portion for said loading of said untrimmed can body and said unloading of said trimmed can body; and
   each of said can processing apparatuses having knurling means separate from said first or second cutting means for cutting and knurling said trimmed away portion.

38. The invention as in claim 37 wherein:
   said knife edge having an arcuate extent greater than about 180 degrees.

39. The invention as in claim 38 and further comprising:
   additional drive means for rotating said second cutting means through at least two complete revolutions for each revolution of said turret.

40. The invention as in claim 39 wherein each revolution of said turret comprises:
   a first 90 degree section for moving an untrimmed can body onto said can processing apparatus;
   a second 90 degree section for trimming said portion away from said untrimmed can body;
   a third 90 degree section for moving said trimmed away portion between said knurling means and for unloading said trimmed can body; and
   a fourth 90 degree section for cutting and knurling said trimmed away portion.

41. Apparatus for trimming away a portion of a can body having an uneven edge on the open end thereof to form a can body of a desired axial extent comprising:
   a support structure;
   a main drive shaft rotatably mounted on said support structure;
   a drive means for rotating said main drive shaft;
   a turret having a plurality of mounting surfaces secured to said main drive shaft for rotation therewith;
   a can processing apparatus removably mounted on each of at least two of said mounting surfaces for rotation with said turret;
   loading and unloading means for loading an untrimmed can body having an uneven edge on the open end thereof onto each of said can processing apparatuses and removing a trimmed can body from each of said can processing apparatuses;
   each of said can processing apparatuses having rotatable cutting means for trimming away a portion of said untrimmed can body;
   said cutting means comprising a first member and a second member;
   said first member having a peripheral surface having a first knife edge formed thereon;
   said second member having a peripheral surface having only a first arcuate portion and a second arcuate portion;
   said first arcuate portion comprising a second knife edge for cooperating with said first knife edge to trim a portion from said untrimmed can body;
   said second arcuate portion providing a space for said loading of said untrimmed can body and for said unloading of said trimmed can body; and
   each of said can processing apparatuses having knurling means separate from said cutting means for cutting and knurling said trimmed away portion.

* * * * *

UNITED STATES PATENT AND TRADEMARK OFFICE
CERTIFICATE OF CORRECTION

PATENT NO. : 5,054,341

DATED : October 8, 1991

INVENTOR(S) : Bert E. Johansson, et al

It is certified that error appears in the above-identified patent and that said Letters Patent is hereby corrected as shown below:

On Title page, item [75], add --Leroy J. Haverland, of Westminster, Colorado--.

Signed and Sealed this

First Day of June, 1993

Attest:

*Attesting Officer*

MICHAEL K. KIRK

*Acting Commissioner of Patents and Trademarks*